US010780949B2

(12) United States Patent
Crain et al.

(10) Patent No.: US 10,780,949 B2
(45) Date of Patent: Sep. 22, 2020

(54) POWER BOOST REGULATOR

(71) Applicant: Polaris Industries Inc., Medina, MN (US)

(72) Inventors: Stephen G. Crain, Wyoming, MN (US); Brad W. Teubner, Roseau, MN (US); Joshua J. Stevens, Delano, MN (US); Joseph D. Tharaldson, Roseau, MN (US); Markus Hoffet, Aarberg (CH); Lawrence J. Hosaluk, Roseau, MN (US); Matthew D. Reeves, North Branch, MN (US); Peter Erasmus, Mellingen (CH); Chad A. Dale, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 15/160,869

(22) Filed: May 20, 2016

(65) Prior Publication Data

US 2016/0339857 A1   Nov. 24, 2016

Related U.S. Application Data

(60) Provisional application No. 62/165,284, filed on May 22, 2015.

(51) Int. Cl.
*B60L 1/00* (2006.01)
*B62M 27/02* (2006.01)
(Continued)

(52) U.S. Cl.
CPC .............. *B62M 27/02* (2013.01); *B60L 1/00* (2013.01); *B60L 15/007* (2013.01);
(Continued)

(58) Field of Classification Search
CPC ....... B62M 27/02; B60L 11/1809; B60L 1/00; B60L 15/007; B60L 2200/22;
(Continued)

(56) References Cited

U.S. PATENT DOCUMENTS 3,736,729 A * 6/1973 Peterson ................ A01D 34/64
56/10.5
6,879,053 B1 4/2005 Welches
(Continued)

FOREIGN PATENT DOCUMENTS

CA      2986482      12/2016
CA      3021812      5/2019
(Continued)

OTHER PUBLICATIONS

International Search Report issued by the European Patent Office, dated Mar. 1, 2017, for International Application No. PCT/US2016/033573, 8 pages.
(Continued)

*Primary Examiner* — Jared Fureman
*Assistant Examiner* — Duc M Pham
(74) *Attorney, Agent, or Firm* — Faegre Drinker Biddle & Reath LLP

(57) ABSTRACT

A power generation system is provided including a power boost regulator operative to provide load matched voltage operation of an AC power source.

6 Claims, 33 Drawing Sheets

(51) Int. Cl.
| | |
|---|---|
| *H02M 3/04* | (2006.01) |
| *H02M 7/04* | (2006.01) |
| *B60L 15/00* | (2006.01) |
| *B60L 15/20* | (2006.01) |
| *B60L 50/10* | (2019.01) |
| *B60L 50/13* | (2019.01) |
| *B60L 50/30* | (2019.01) |
| *B60L 53/00* | (2019.01) |
| *B60R 16/03* | (2006.01) |
| *H02K 7/02* | (2006.01) |
| *H02K 7/18* | (2006.01) |
| *H02K 9/06* | (2006.01) |
| *B60W 10/06* | (2006.01) |
| *B60W 10/08* | (2006.01) |
| *B60W 20/00* | (2016.01) |

(52) U.S. Cl.
CPC ........... *B60L 15/2045* (2013.01); *B60L 50/10* (2019.02); *B60L 50/13* (2019.02); *B60L 50/30* (2019.02); *B60L 53/00* (2019.02); *B60R 16/03* (2013.01); *B60W 10/06* (2013.01); *B60W 10/08* (2013.01); *B60W 20/00* (2013.01); *H02K 7/02* (2013.01); *H02K 7/1807* (2013.01); *H02K 9/06* (2013.01); *H02M 3/04* (2013.01); *H02M 7/04* (2013.01); *B60L 2200/22* (2013.01); *B60L 2210/30* (2013.01); *B60L 2220/50* (2013.01); *B60L 2240/427* (2013.01); *B60L 2240/429* (2013.01); *B60L 2240/441* (2013.01); *B60L 2240/445* (2013.01); *Y02T 10/641* (2013.01); *Y02T 10/645* (2013.01); *Y02T 10/70* (2013.01); *Y02T 10/7077* (2013.01); *Y02T 10/7241* (2013.01); *Y02T 10/7283* (2013.01)

(58) Field of Classification Search
CPC ..... B60L 2240/427; H02M 3/04; H02M 7/04; B60R 16/03; H02K 7/02; H02K 9/06; B60W 10/06; B60W 20/00; Y02T 10/7077
See application file for complete search history.

(56) References Cited

U.S. PATENT DOCUMENTS

| | | |
|---|---|---|
| 7,089,917 B1 | 8/2006 | McKinster |
| 7,091,635 B1 | 8/2006 | Gilliland |
| 7,239,032 B1 | 7/2007 | Wilson |
| 7,252,165 B1 * | 8/2007 | Gruenwald ............. B60L 1/003 180/65.25 |
| 7,309,929 B2 | 12/2007 | Donnelly |
| 7,573,145 B2 | 8/2009 | Peterson |
| 7,633,248 B1 | 12/2009 | Williams |
| 7,646,178 B1 | 1/2010 | Fradella |
| 7,708,097 B1 | 5/2010 | Tharaldson |
| 7,822,514 B1 | 10/2010 | Erickson |
| 8,138,630 B2 | 3/2012 | Dibachi |
| 8,182,393 B2 | 5/2012 | Gillingham |
| 8,269,457 B2 | 9/2012 | Wenger |
| 8,534,397 B2 | 9/2013 | Grajkowski |
| 8,682,550 B2 | 3/2014 | Nelson |
| 9,096,289 B2 | 8/2015 | Hedlund |
| 9,440,504 B2 | 9/2016 | Bagnariol |
| 9,505,398 B2 | 11/2016 | Gotoh |
| 9,506,407 B2 | 11/2016 | Blake |
| 9,722,443 B2 | 8/2017 | Ishida |
| 9,828,065 B2 | 11/2017 | Pard |
| 9,941,775 B2 | 4/2018 | Fiseni |
| 2002/0027029 A1 | 3/2002 | Yatagai |
| 2004/0037100 A1 | 2/2004 | Orr |
| 2004/0251072 A1 | 12/2004 | Morii |
| 2005/0046191 A1 | 3/2005 | Cole |
| 2005/0146308 A1 * | 7/2005 | Quazi ................ B60L 11/02 322/28 |
| 2006/0028778 A1 | 2/2006 | O'Gorman |
| 2006/0066163 A1 | 3/2006 | Melfi |
| 2006/0070782 A1 | 4/2006 | Morin |
| 2006/0102403 A1 | 5/2006 | Inoguchi |
| 2006/0128521 A1 | 6/2006 | Fukushima |
| 2007/0007818 A1 | 1/2007 | O'Gorman |
| 2007/0057648 A1 | 3/2007 | Tsuzuki |
| 2007/0227470 A1 | 10/2007 | Cole |
| 2007/0268004 A1 | 11/2007 | Rozman |
| 2008/0011528 A1 | 1/2008 | Verbrugge |
| 2008/0097664 A1 | 4/2008 | Aoyama |
| 2008/0157592 A1 * | 7/2008 | Bax ................. B60L 11/123 307/10.1 |
| 2008/0157594 A1 | 7/2008 | Peterson |
| 2008/0176705 A1 | 7/2008 | Tamai |
| 2009/0033181 A1 | 2/2009 | Hamada |
| 2009/0058374 A1 | 3/2009 | Evans |
| 2009/0107743 A1 | 4/2009 | Alston |
| 2009/0140574 A1 | 6/2009 | Gorman |
| 2009/0255745 A1 | 10/2009 | Kukowski |
| 2010/0133029 A1 | 6/2010 | Moran |
| 2010/0192538 A1 | 8/2010 | Boren |
| 2010/0307465 A1 | 12/2010 | Haldeman |
| 2011/0012422 A1 | 1/2011 | Neher |
| 2011/0013322 A1 | 1/2011 | Gale |
| 2011/0168462 A1 | 7/2011 | Stanek |
| 2011/0181240 A1 | 7/2011 | Baarman |
| 2011/0297462 A1 | 12/2011 | Grajkowski |
| 2012/0186888 A1 * | 7/2012 | Ross ................ B60K 1/02 180/65.31 |
| 2012/0256422 A1 | 10/2012 | Fradella |
| 2013/0032420 A1 | 2/2013 | Mills |
| 2013/0068003 A1 | 3/2013 | Kumar |
| 2013/0131903 A1 | 5/2013 | Araki |
| 2013/0140888 A1 * | 6/2013 | Edwards ............. H02J 1/10 307/20 |
| 2013/0271093 A1 | 10/2013 | Komurasaki |
| 2013/0307450 A1 | 11/2013 | Fuller |
| 2014/0067183 A1 | 3/2014 | Sisk |
| 2014/0095018 A1 | 4/2014 | Atluri |
| 2015/0091478 A1 | 4/2015 | Marzano |
| 2015/0197313 A1 | 7/2015 | Vistad |
| 2015/0217815 A1 | 8/2015 | Martel |
| 2015/0258946 A1 | 9/2015 | Namuduri |
| 2015/0299985 A1 | 10/2015 | Takehara |
| 2015/0381070 A1 | 12/2015 | Backman |
| 2016/0065398 A1 | 3/2016 | Candage |
| 2016/0152129 A1 | 6/2016 | West |
| 2016/0164309 A1 | 6/2016 | Bonafe |
| 2016/0211784 A1 | 7/2016 | Fujisawa |
| 2016/0211785 A1 | 7/2016 | Green |
| 2016/0339997 A1 | 11/2016 | Crain et al. |
| 2017/0179768 A1 | 6/2017 | Jurok |
| 2017/0314487 A1 * | 11/2017 | Houle ................ B60W 10/107 |
| 2018/0086419 A1 | 3/2018 | Crain et al. |
| 2018/0272873 A1 | 9/2018 | Rohera |
| 2019/0185110 A1 | 6/2019 | Hosaluk |

FOREIGN PATENT DOCUMENTS

| | | |
|---|---|---|
| GB | 2500944 A | 10/2013 |
| WO | WO 2008/076694 A2 | 6/2008 |
| WO | WO2009114414 A1 | 9/2009 |
| WO | WO 2011/030192 | 3/2011 |
| WO | WO 2013/019826 | 2/2013 |
| WO | WO 2016/191290 | 1/2016 |

OTHER PUBLICATIONS

Written Opinion issued by the European Patent Office, dated Mar. 1, 2017, for International Application No. PCT/US2016/033573, 13 pages.

(56) References Cited

OTHER PUBLICATIONS

Non-Final Office Action issued by the U.S. Patent and Trademark Office, dated Jun. 25, 2019, for U.S. Appl. No. 15/160,866; 17 pages.
Non-Final Office Action issued by the U.S. Patent and Trademark Office, dated Feb. 21, 2019, for U.S. Appl. No. 15/819,691; 20 pages.
Response to Non-Final Office Action filed with the U.S. Patent and Trademark Office, dated May 22, 2019, for U.S. Appl. No. 15/819,691; 7 pages.
Non-Final Office Action issued by the U.S. Patent and Trademark Office, dated Feb. 15, 2018, for U.S. Appl. No. 15/160,866; 17 pages.
Response to Non-Final Office Action filed with the U.S. Patent and Trademark Office, dated Jul. 10, 2018, for U.S. Appl. No. 15/160,866; 11 pages.
Final Office Action issued by the U.S. Patent and Trademark, dated Nov. 28, 2018, for U.S. Appl. No. 15/160,866; 22 pages.
Response to Final Office Action filed with the U.S. Patent and Trademark Office, dated May 15, 2019, for U.S. Appl. No. 15/160,866; 8 pages.
Office Action issued by the Canadian Intellectual Property Office, dated Feb. 12, 2019, for Canadian Patent Application No. 2,986,482; 3 pages.
International Preliminary Report on Patentability issued by the European Patent Office, dated Oct. 30, 2017, for International Patent Application No. PCT/US2016/033573; 24 pages.

* cited by examiner

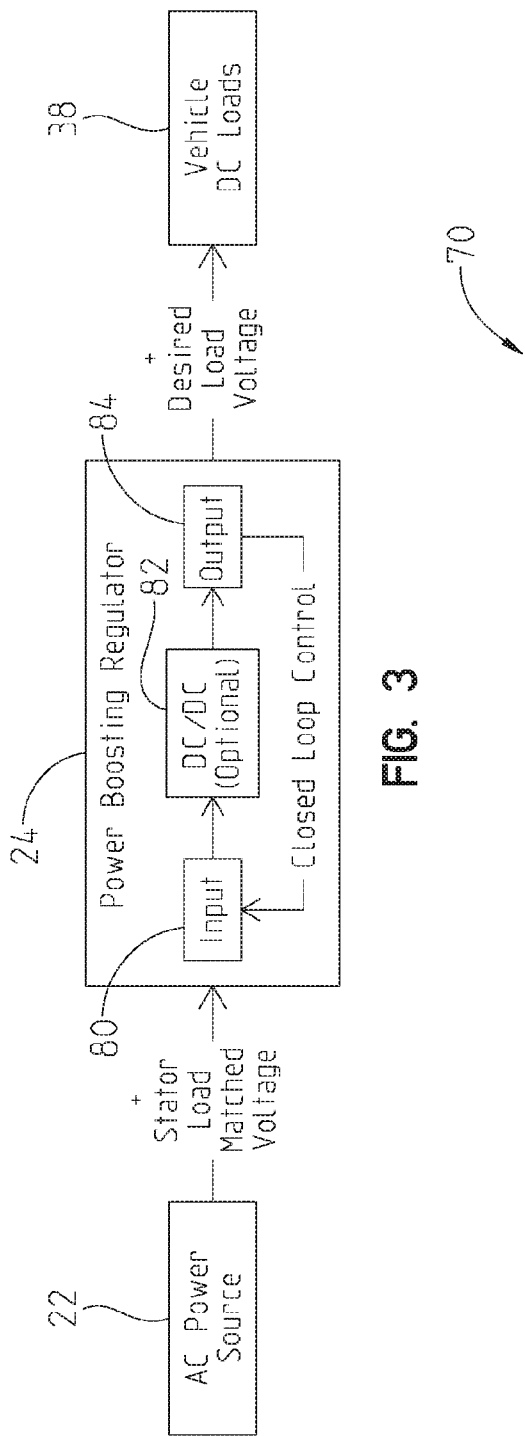

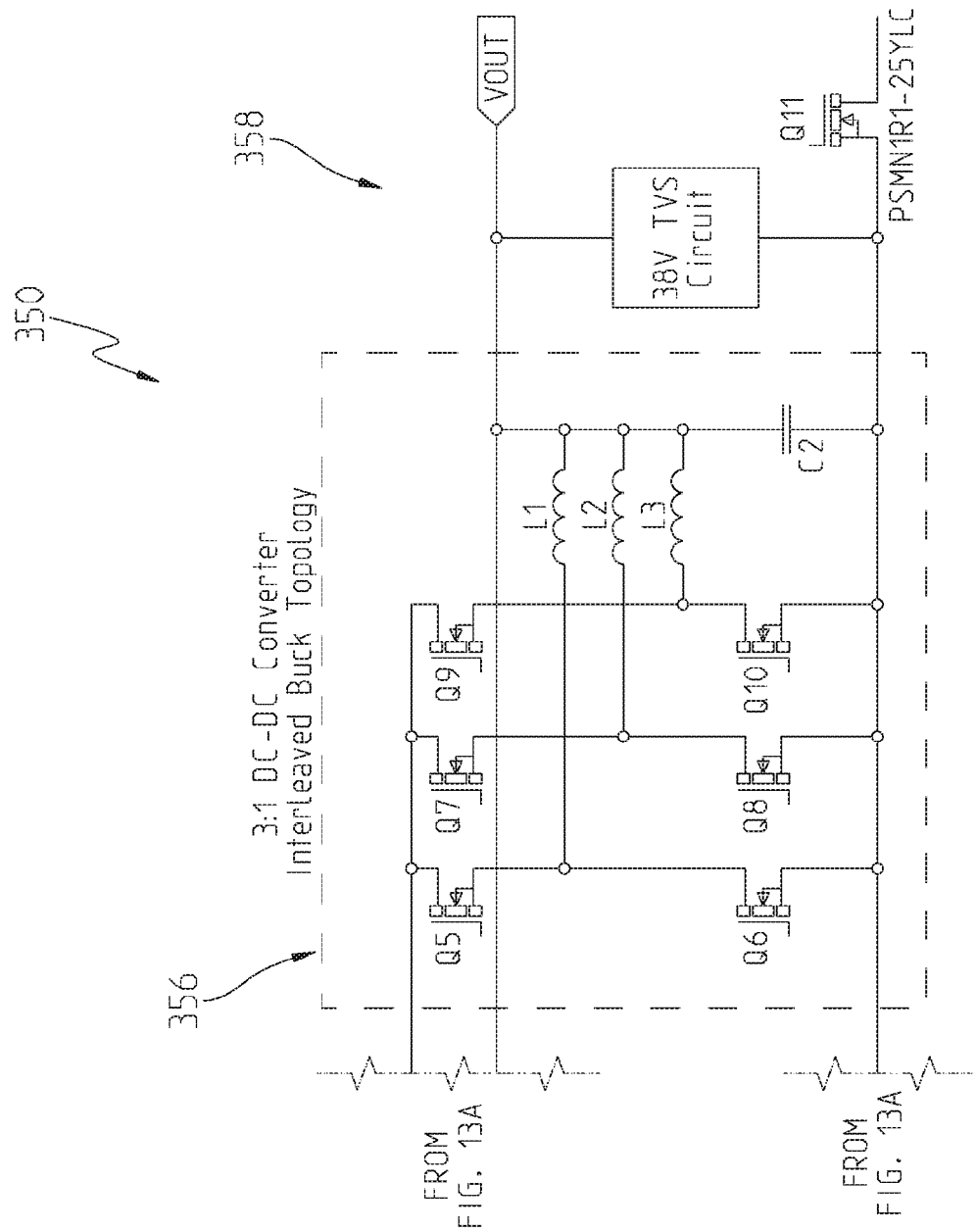

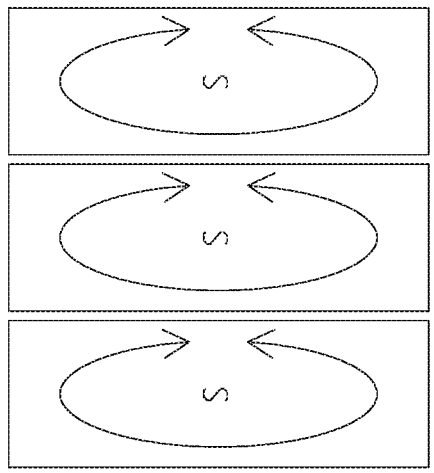
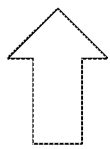
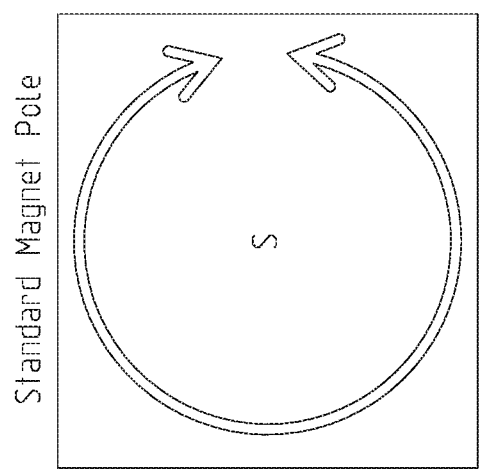
FIG. 23A
FIG. 23B

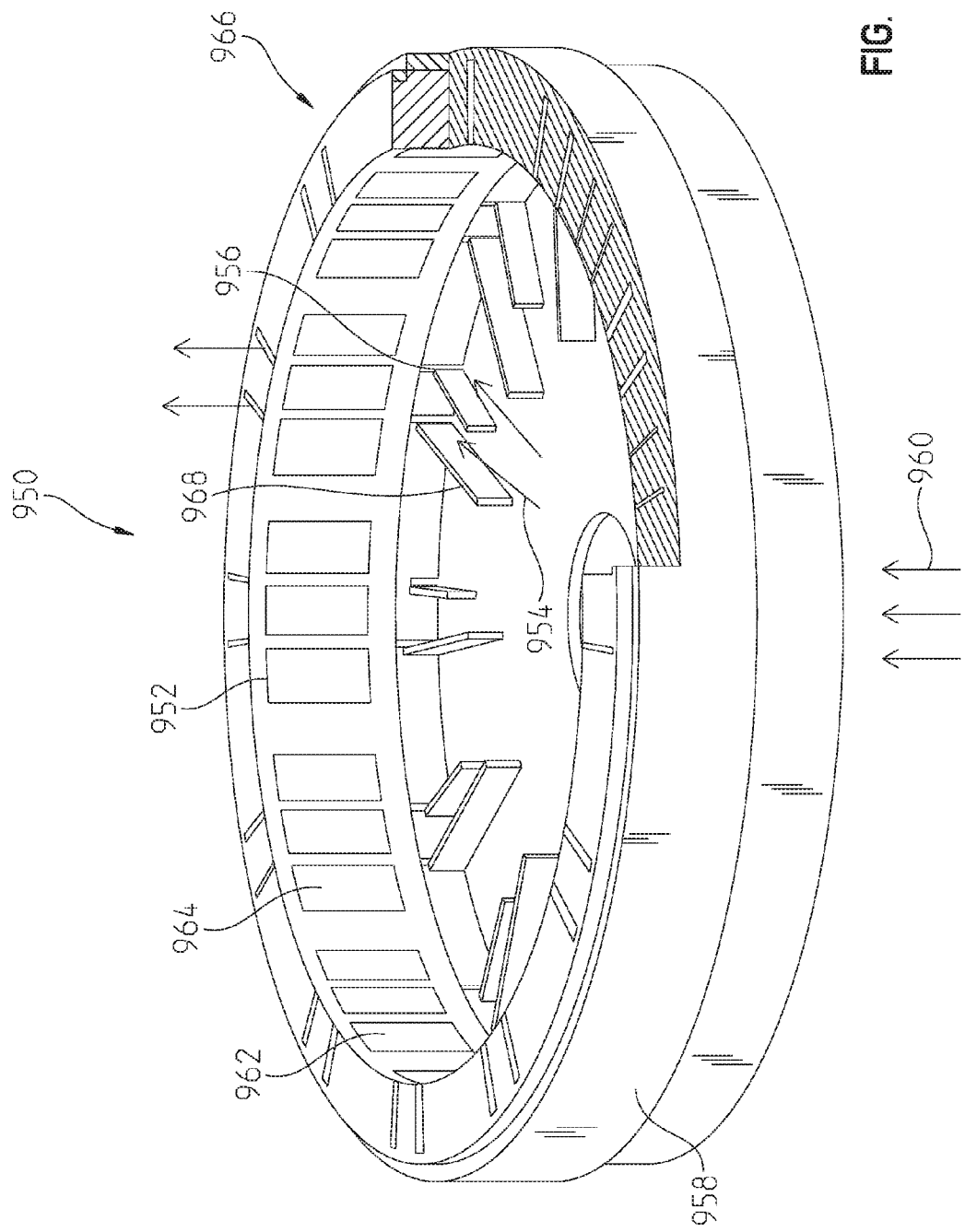

POWER BOOST REGULATOR

PRIORITY

The present application is a non-provisional application that claims priority to U.S. Provisional Application Ser. No. 62/165,284 Filed May 22, 2015 titled POWER BOOST REGULATOR, the disclosure of which is hereby incorporated by reference.

FIELD OF THE DISCLOSURE

The present disclosure relates to power generation systems of a vehicle and more particularly to a power boost regulator configured to provide load-matched voltage operation.

BACKGROUND

Electrical power requirements in recreational vehicles, including Off Road Vehicles, ATVs, snowmobiles, etc., continue to rise as a consequence of increasing electrical loads. Growing electrical power requirements are driving the need for increased power output from the magneto or alternator charging systems that serve as the core of a vehicle's electrical system. Traditionally, magneto size has been scaled to meet increasing electrical power demands, which results in increased cost.

The power generation systems of many vehicles operate at a fixed load voltage. A load voltage is selected and the charging system is operated at this voltage throughout the RPM range. Such a system results in reduced power at low and high engine speeds and causes the charging system to compromise between power needed at high engine speeds and power needed for engine starting/idling. For example, FIG. 5 illustrates an exemplary power curve 104 showing exemplary power provided by a conventional power generation system over a range of engine speeds. Curve 104 depicts that the conventional power generator compromises on power available at low and/or high engine speeds due to the fixed load voltage constraint and fails to capitalize on maximum power output at low and high engine speeds. In addition, some engines, such as air-cooled engines of snowmobiles for example, are prone to overheating when large currents are produced by the magneto to provide the required vehicle power at the fixed load voltage.

Some vehicles, such as snowmobiles or other recreational vehicles, include a manual start system, such as a recoil start or a kick start system, for starting the engine of the vehicle. The power requirements for controlling the engine start-up are often difficult to achieve with a manual start. For example, the low engine speeds initiated by the manual pull are often insufficient to generate sufficient power for the engine control unit, thereby forcing multiple manual start attempts by the rider.

Some recreational vehicles include a plow or other work tool that is driven by a winch or other electric machine that draws power from the power generation system. The engine speed may not be sufficient to maintain proper power levels to other loads while the electric machine draws power during the plow operation. For example, the battery charge level may not be sufficiently maintained during plowing as a result of the current draw by the plow.

SUMMARY

The present disclosure provides a power boost regulator operative to harness larger amounts of power from a magneto. In some embodiments, the regulator utilizes low loss field effect transistors (FETs) to implement switching transformations to allow for load matched voltage operation at the stator throughout the entire RPM range. For example, the power boost regulator induces a desired voltage/current combination at the stator for each engine speed to provide the demanded electrical load. In some embodiments, this allows for an increase in power output from a given stator without requiring alteration to the stator or flywheel.

BRIEF DESCRIPTION OF THE DRAWINGS

FIG. 3 is a representative view of exemplary stages of the power boost regulator of FIG. 1 including an input stage, a DC/DC converter stage, and an output stage;

FIG. 4 is a representative view of exemplary configurations of the power boost regulator of FIG. 1;

FIG. 11D is a schematic view of another exemplary power boost regulator including a boost rectifier stage and a power/current steering stage;

FIGS. 13A-B are a schematic view of another exemplary power boost regulator including a shunt regulator stage and an interleaved buck converter stage;

FIG. 23A is a schematic view of a magnet pole;

FIG. 23B is a schematic view of a segmented magnet pole;

FIG. 30 is a perspective partially-cut-away view of a flywheel usable with the engine of FIG. 17.

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

Figure 1:
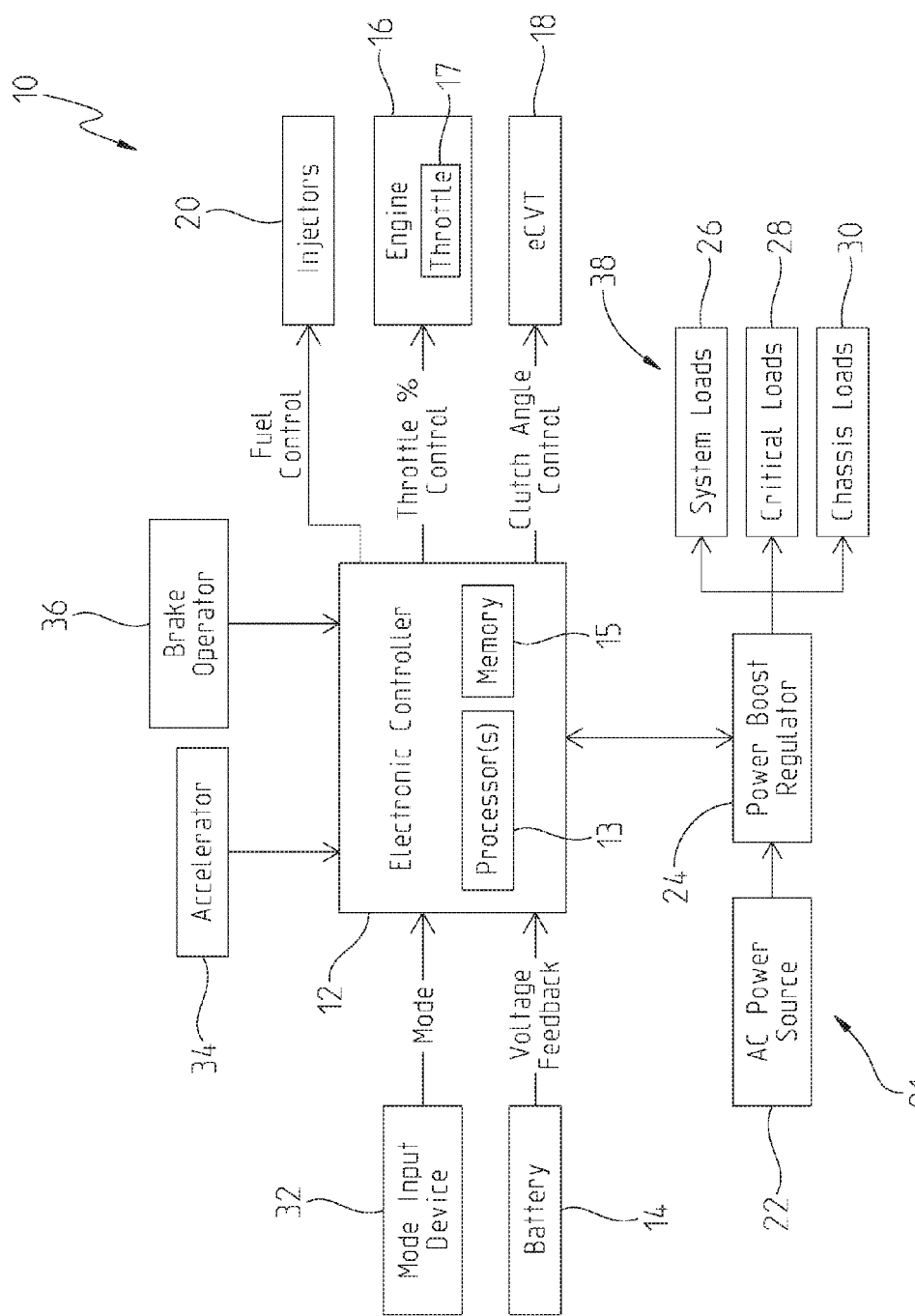
FIG. 1 is a diagrammatical view of an exemplary vehicle control system of the present disclosure including a power boost regulator.

Referring initially to FIG. 1, an illustrative embodiment of a vehicle control system 10 includes an electronic controller 12, an engine 16, a transmission 18, and an AC power source 22 driven by engine 16. A power boost regulator 24 in communication with electronic controller 12 is operative to control the generation and delivery of power provided by power source 22, as described herein. AC power source 22, power boost regulator 24, and electronic controller 12 provide a power generation system 21 for the vehicle.

Electronic controller 12 receives a plurality of inputs and controls a plurality of output devices of the vehicle. For example, controller 12 is operative to output an electrical signal indicative of a throttle percentage to an actuator of throttle 17 to control a position of the throttle valve for regulating air intake and controlling engine speed. In one embodiment, the throttle opening percentage is based at least in part on the detected position of accelerator 34 actuated by the rider. Accelerator 34, which includes a position sensor, may be an accelerator pedal, a thumb actuated lever, a twist grip, or any other suitable operator input device that, when actuated by an operator, is configured to provide an operator throttle demand to controller 12. A throttle valve position sensor provides feedback to controller 12 indicative of the actual position or degree of opening of throttle 17. Additional details of electronic throttle control provided with controller 12 is disclosed in U.S. patent application Ser. No. 13/152,981, filed Jun. 3, 2011, entitled ELECTRONIC THROTTLE CONTROL, the entire disclosure of which is expressly incorporated by reference herein.

In some embodiments, controller 12 receives signals from position sensor(s) of a user-operated brake 36 identifying a brake demand and controls the vehicle brakes (if equipped) based on the brake demand. The vehicle may alternatively include mechanically (e.g., cable) controlled brakes and/or throttle. A mode input device 32 provides a signal to controller 12 representative of a mode of operation (e.g., normal, plow, generation, performance, etc.) of the vehicle. Control system 10 includes a battery 14 providing voltage and/or state of charge feedback to controller 12, although in other embodiments the vehicle may be batteryless.

Controller 12 includes one or more processors 13 that execute software and/or firmware code stored in internal or external memory 15 of controller 12. The software/firmware code contains instructions that, when executed by the one or more processors 13 of controller 12, causes controller 12 to perform the vehicle functions described herein. Controller 12 may alternatively include one or more application-specific integrated circuits (ASICs), field-programmable gate arrays (FPGAs), digital signal processors (DSPs), hardwired logic, or combinations thereof. Controller 12 may include one or more physical control modules in communication with one another. For example, controller 12 may include one or more of an engine control unit (ECU), a vehicle control unit (VCU), a transmission control unit (TCU), and/or other suitable control modules operating to control the functionality of the vehicle.

Memory 15 is any suitable computer readable medium that is accessible by the processor(s) 13 of controller 12. Memory 15 may be a single storage device or multiple storage devices, may be located internally or externally to controller 12, and may include both volatile and non-volatile media. Exemplary memory 15 includes random-access memory (RAM), read-only memory (ROM), electrically erasable programmable ROM (EEPROM), flash memory, CD-ROM, Digital Versatile Disk (DVD) or other optical disk storage, a magnetic storage device, or any other suitable medium which is configured to store data and which is accessible by controller 12.

Transmission 18 illustratively includes an electronically controlled continuously variable transmission (eCVT), although other transmission types may be provided. Electronic controller 12 provides a clutch angle control signal to eCVT 18 to control the transmission gear ratio. Additional details of the control and operation of eCVT 18 are disclosed in U.S. patent application Ser. No. 13/652,253, filed Oct. 15, 2012, entitled PRIMARY CLUTCH ELECTRONIC CVT, issued as U.S. Pat. No. 8,682,550, the entire disclosure of which is expressly incorporated by reference herein.

Power source 22 provides alternating current (AC) power for use by various components and systems of the vehicle. In the illustrated embodiment, power source 22 includes a magneto or alternator (e.g., magneto 524 of FIG. 18)

coupled to the output of engine 16. Engine 16 drives power source 22 to generate the AC power regulated by power boost regulator 24.

Power boost regulator 24 is operative to control the generation and delivery of power provided by power source 22. Power boost regulator 24 includes an AC-DC converter operative to convert the AC generated power from power source 22 to DC power deliverable to electrical loads 38. As described herein, power boost regulator 24 is operative to provide load matched voltage operation by inducing in the stator a voltage and current to achieve a target power output for each engine speed. Further, power boost regulator 24 is operative to selectively direct power to different electrical loads 38 based on the available power and a power distribution priority, as described herein. Illustrative electrical loads 38 include system loads 26, critical loads 28, and chassis loads 30. System loads 26 include one or more electronic control units of the vehicle, such as the engine control unit (ECU) of controller 12, for example, for controlling engine operation such as fuel injection and ignition. Critical loads 28 include critical components for engine operation such as the fuel pump, oil pump, and electrical valve actuator (e.g., throttle valve actuator, etc.). Chassis loads 30 include, for example, vehicle lights, a battery charging system, air conditioning, panel instrumentation, electrically operated handwarmers, and other suitable non-critical loads.

Figure 2:
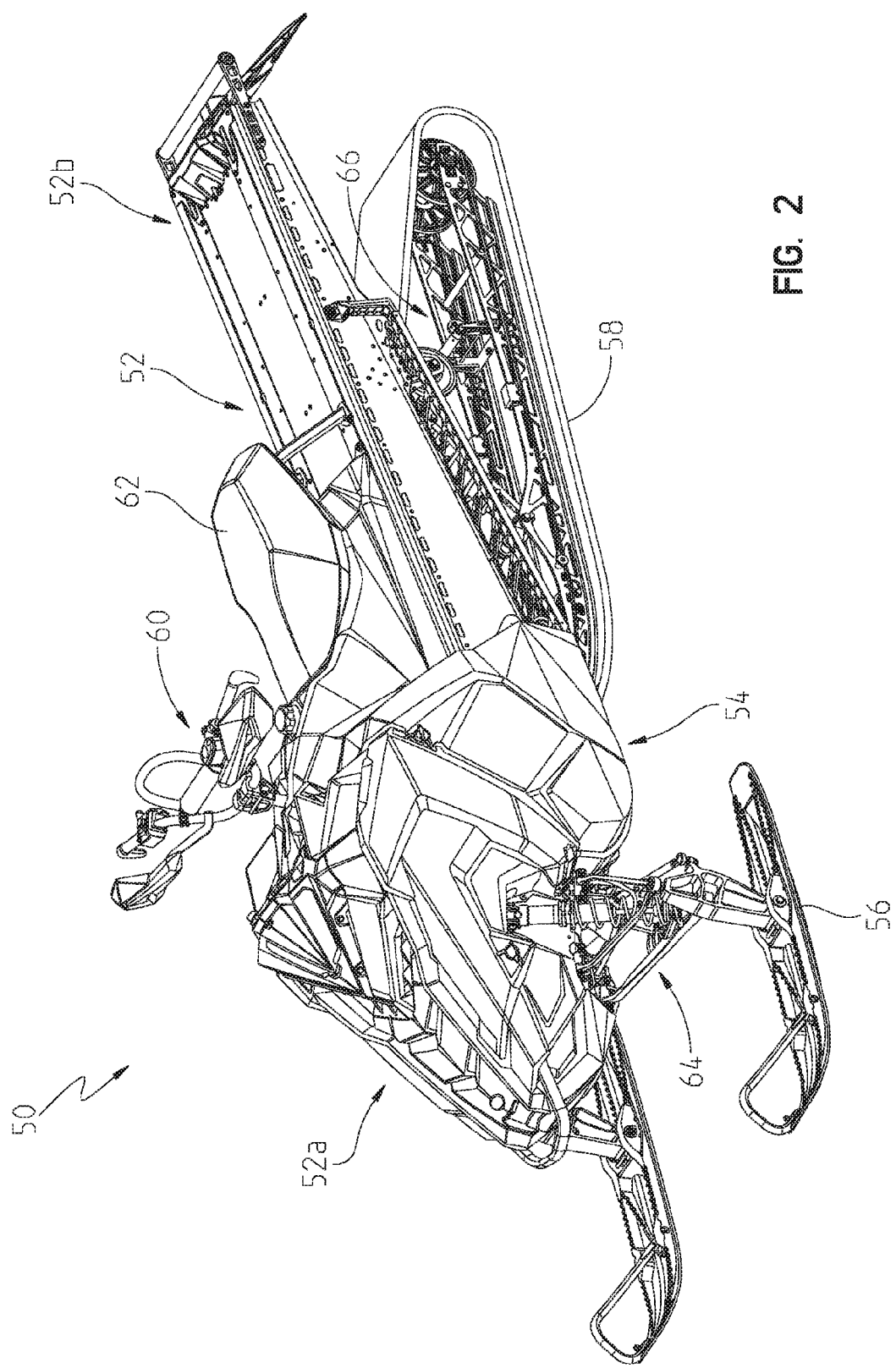
FIG. 2 is a left front perspective view of a vehicle, illustratively a snowmobile, incorporating the power boost regulator of FIG. 1.

Referring to FIG. 2, an exemplary vehicle incorporating control system 10 of FIG. 1 is illustrated in the form of a snowmobile 50. Other suitable vehicles may incorporate control system 10. Snowmobile 50 of FIG. 2 includes a chassis or frame 52 having a front frame portion 52a and a rear frame portion 52b. A body assembly 54 generally surrounds at least front frame portion 52a of frame 52. Front frame portion 52a is supported by front ground-engaging members, illustratively skis 56, and rear frame portion 52b is supported by a rear ground-engaging member, illustratively an endless track 58. The rider uses a steering assembly 60, which is operably coupled to at least skis 56, to control the direction of snowmobile 50. A seat assembly 62 is provided generally rearward of steering assembly 60 and is configured to support the rider.

Front skis 56 are operably coupled to a front suspension assembly 64, and endless track 58 cooperates with a rear suspension assembly 66. A powertrain assembly is positioned generally intermediate front suspension assembly 64 and rear suspension assembly 66, and provides power to endless track 58 to move snowmobile 50. For example, the powertrain assembly includes engine 16 and transmission 18 of FIG. 1 and at least one drive shaft. Additional details of snowmobile 50 are disclosed in U.S. patent application Ser. No. 13/763,282, filed on Feb. 8, 2013, U.S. patent application Ser. No. 14/151,983, filed on Jan. 10, 2014, U.S. patent application Ser. No. 14/152,596, filed on Jan. 10, 2014, U.S. Provisional Patent Application Ser. No. 61/513,949, filed on Aug. 1, 2011, and U.S. Provisional Patent Application Ser. No. 61/582,426, filed on Jan. 2, 2012, the complete disclosures of which are expressly incorporated by reference herein.

Referring to FIG. 3, a system level diagram of power boost regulator 24 of FIG. 1 is illustrated. Power boost regulator 24 implements closed loop control to induce a load matched voltage in the stator of power source 22, i.e., a voltage and current in the stator corresponding to a stator power output suitable for the load. Power boost regulator 24 illustratively includes an input portion or stage 80, a DC/DC conversion stage 82, and an output stage 84. In the illustrated embodiment, input stage 80 includes an AC-DC rectifier and boost converter circuit, conversion stage 82 includes a DC/DC buck converter circuit, and output stage 84 includes a power/current distribution circuit, such as a current steering circuit as described herein or another suitable distribution circuit. In another embodiment, power boost regulator 24 includes only input stage 80 and output stage 84 and does not include DC/DC conversion stage 82.

Figure 11A:
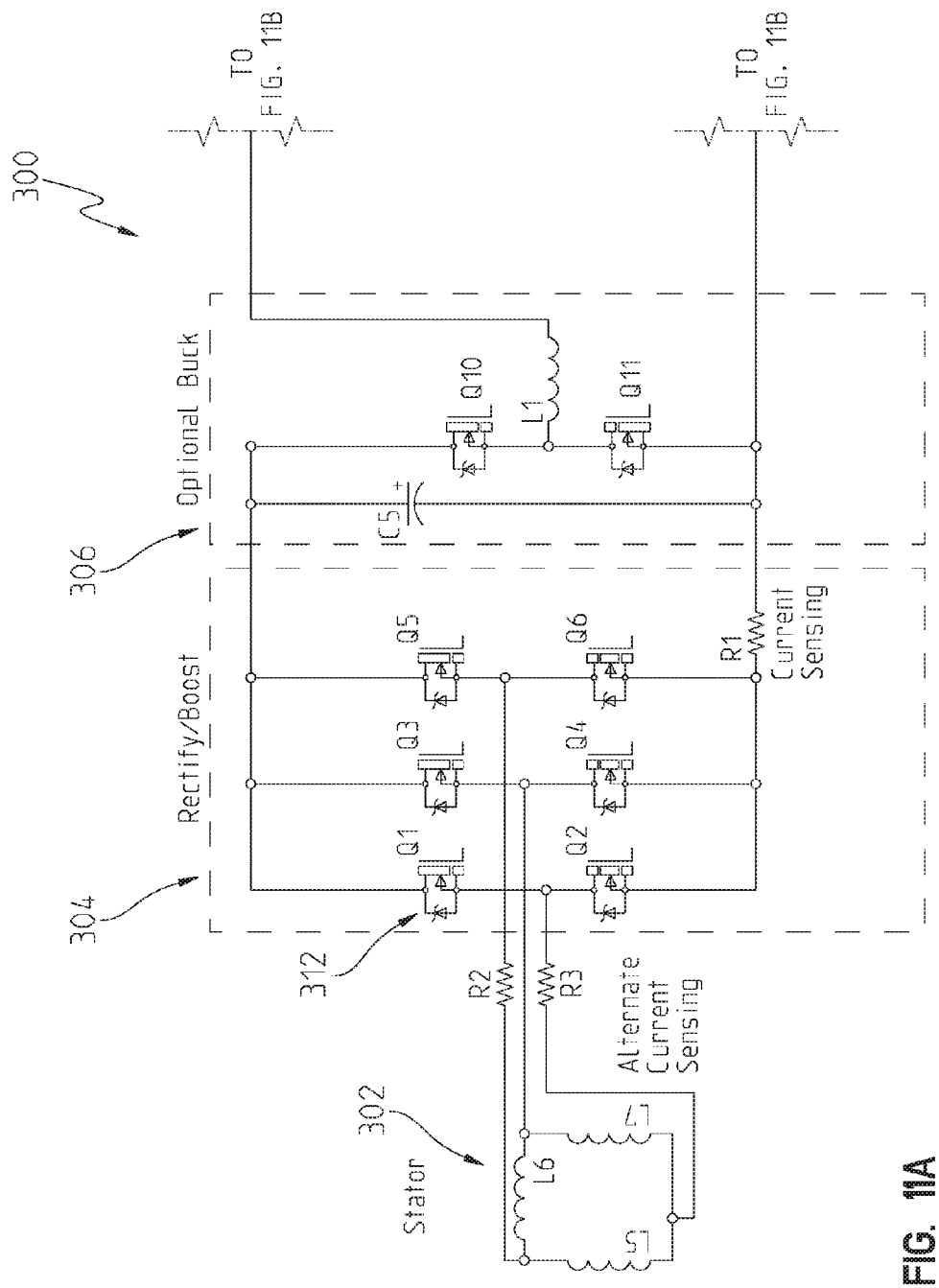
FIGS. 11A-B are a schematic view of an exemplary power boost regulator including a boost rectifier stage, a buck converter stage, and a power/current steering stage.
Figure 11B:
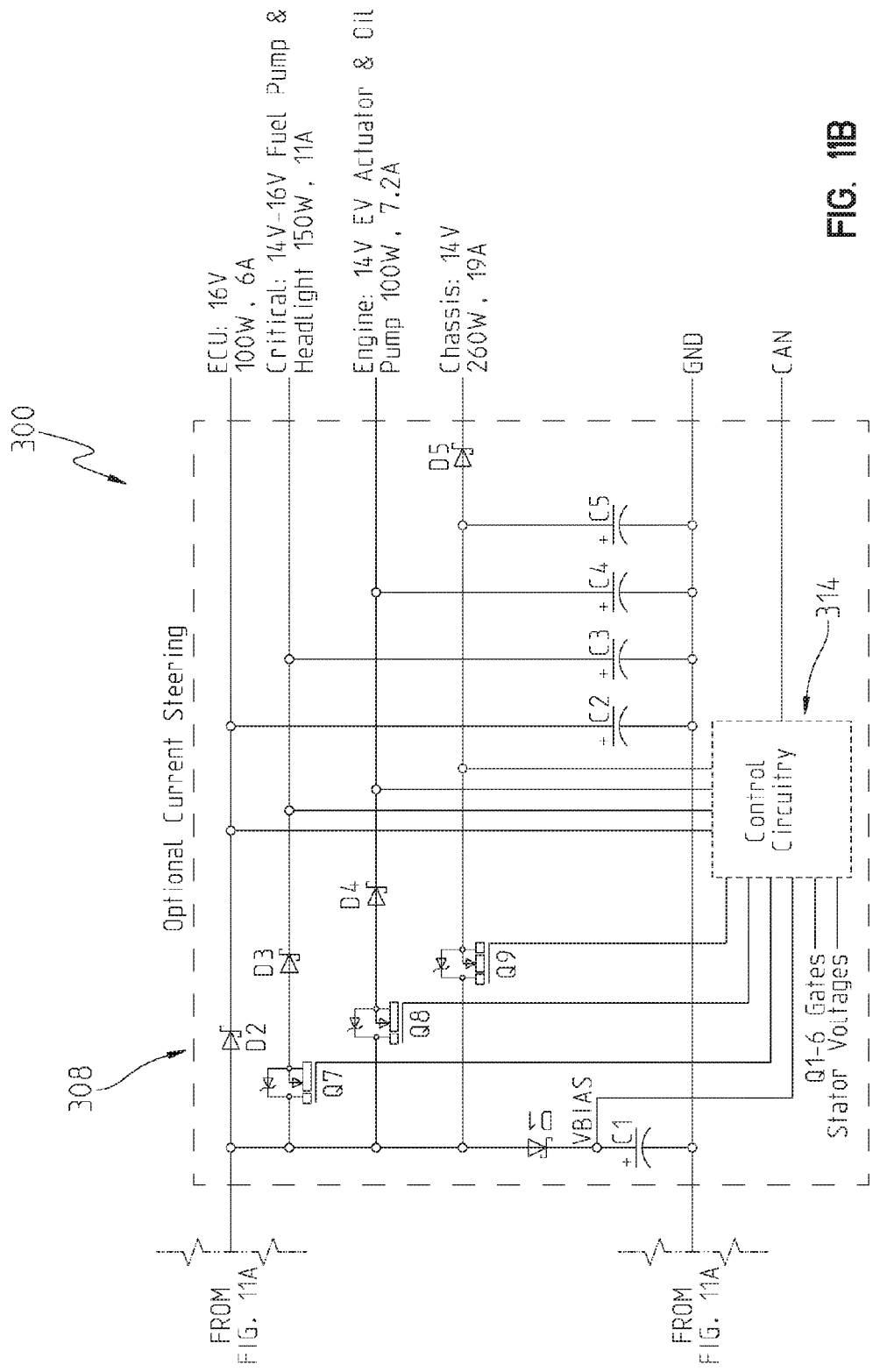
Figure 13A:
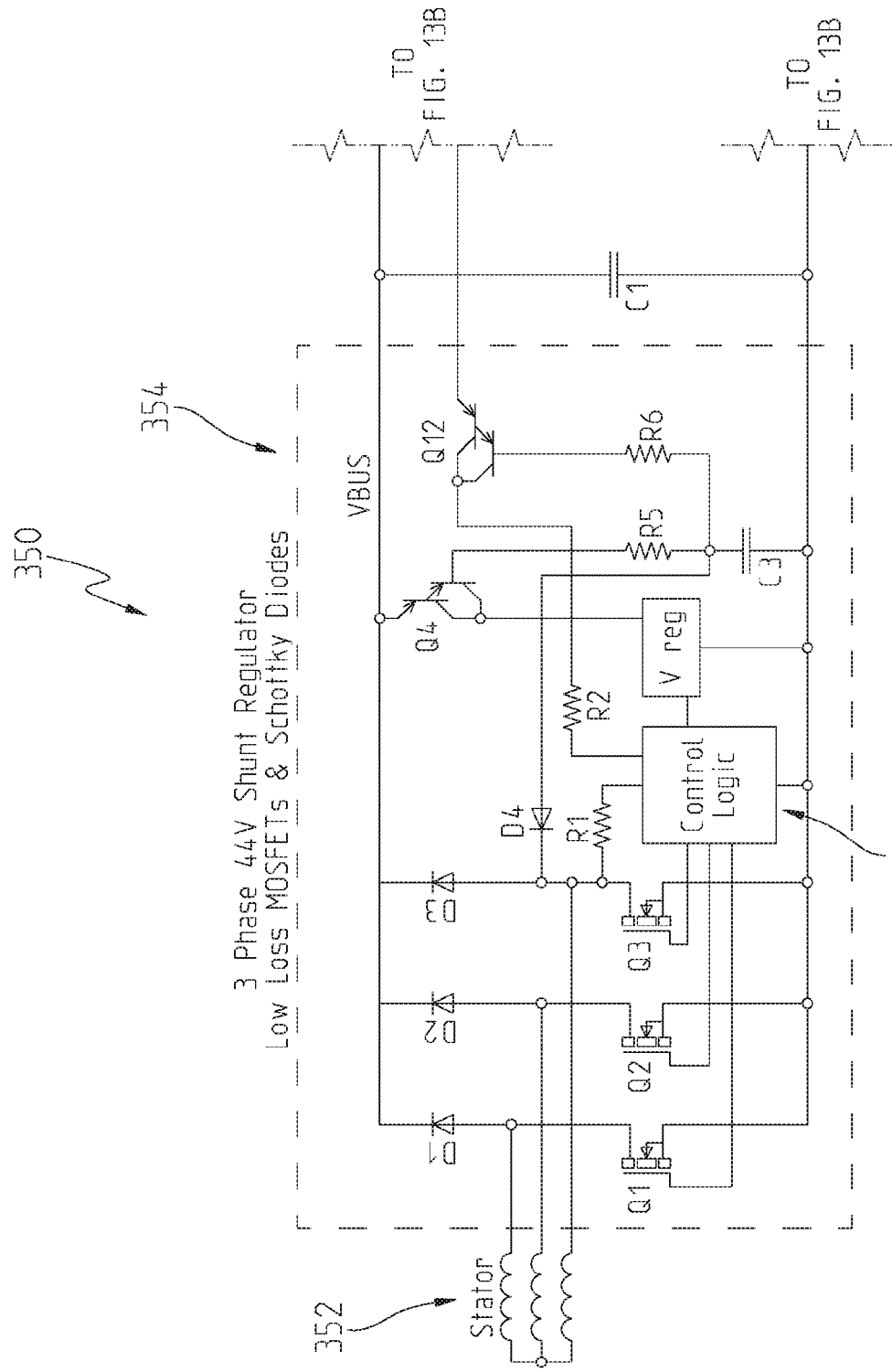

FIG. 4 includes a chart 70 illustrating three different configurations 72 of power boost regulator 24 including a boost configuration, a boost-buck configuration, and a boost-interleaved buck configuration. In each configuration, power boost regulator 24 includes a boost rectifier circuit as input stage 80 that includes an AC-DC rectifier and a boost converter. In the boost configuration, power boost regulator 24 does not include a DC-DC converter stage 82 and includes a current steering circuit as the output stage 84. In the boost-buck configuration, power boost regulator 24 includes a step-down buck converter circuit as DC/DC stage 82 and a current steering circuit as output stage 84. In the boost-interleaved buck configuration, power boost regulator 24 includes interleaved buck converter circuit as DC/DC stage 82 and a single output circuit as output stage 84. Alternatively, the boost-interleaved buck configuration may include a current steering circuit as the output stage 84. An exemplary boost rectifier circuit 304, step down buck converter circuit 306, and current steering circuit 308 are illustrated in FIG. 11A-B and described herein. An exemplary interleaved buck converter circuit 356 and single output circuit 358 are illustrated in FIGS. 13A-B and described herein.

Figure 5:
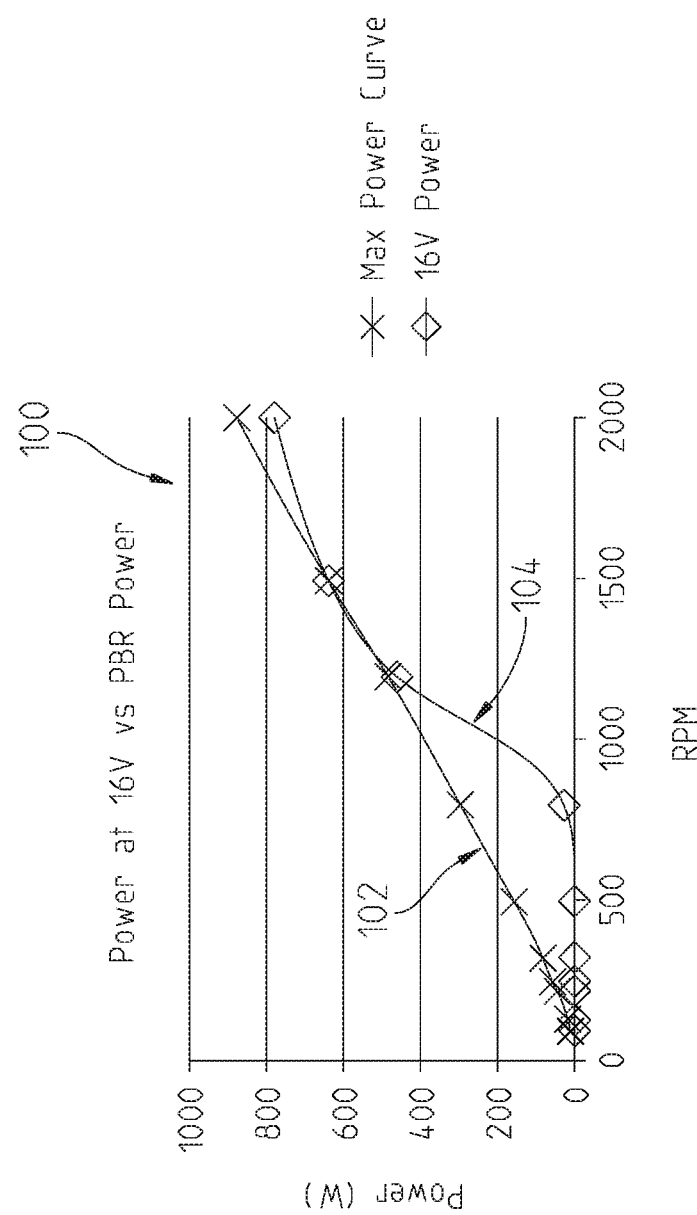
FIG. 5 is a graph illustrating a conventional power curve and a power curve provided with the power boost regulator of FIG. 1 over an engine speed range according to some embodiments.

FIG. 5 is a graph 100 illustrating two exemplary power curves 102, 104 versus engine speed (RPM). Power curve 102 illustrates exemplary maximum power in Watts (W) that AC power source 22 is operative to generate over a range of engine speeds as controlled by power boost regulator 24. Curve 104 illustrates the maximum power that a conventional generation system is able to provide over the same range of engine speeds due to operation at a fixed system load voltage (e.g., 16V). As illustrated in FIG. 5, power boost regulator 24 of FIG. 1 is operative to capture and store additional energy at low engine speeds, illustratively speeds between zero RPM and 1200 RPM, as well as at high engine speeds, illustratively speeds greater than 1500 RPM. While an exemplary speed range of 2000 RPM is illustrated in FIG. 5, other suitable speed ranges may be provided depending on engine type and configuration. Accordingly, power boost regulator 24 serves to increase the available electrical power across a larger range or an entire range of engine speeds as compared to the conventional AC/DC rectifier. In an embodiment with engine having a manual start (e.g., pull-start, kick-start, etc.), the likelihood of the engine starting after a single pull or kick on the recoil starter is improved due to the availability of power at lower engine speeds.

Figure 6:
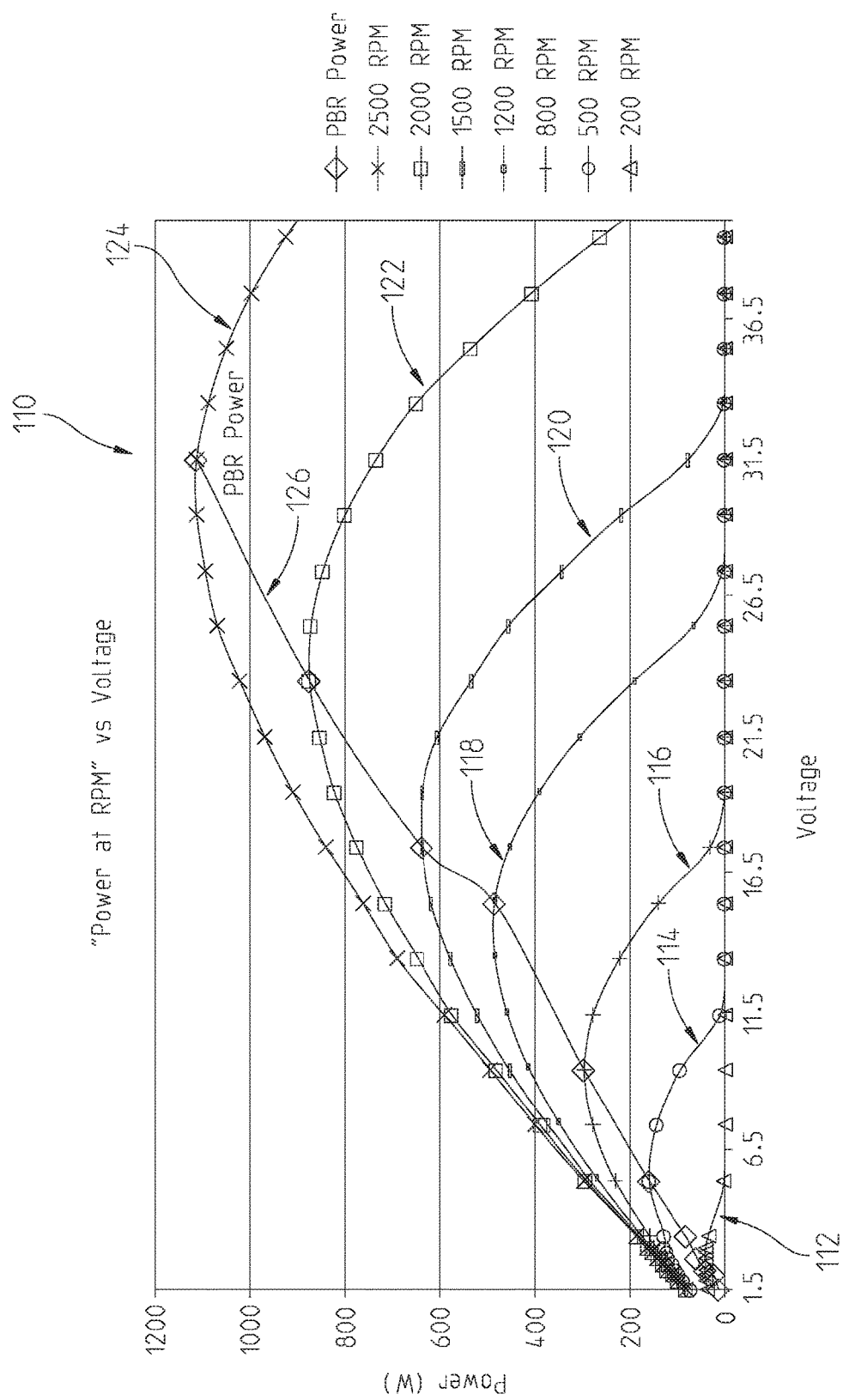
FIG. 6 is a graph illustrating power versus voltage curves for a plurality of different engine speeds provided by the power boost regulator of FIG. 1 according to some embodiments.

Referring to FIG. 6, a graph 110 illustrates exemplary power (W) versus voltage (V) curves generated by AC power source 22 of FIG. 1 as controlled by power boost regulator 24 of FIG. 1 for a subset of engine speeds (RPM). Curve 112 represents generated power at 200 RPM, curve 114 represents generated power at 500 RPM, curve 116 represents generated power at 800 RPM, curve 118 represents generated power at 1200 RPM, curve 120 represents generated power at 1500 RPM, curve 122 represents generated power at 2000 RPM, and curve 124 represents generated power at 2500 RPM. As illustrated, the output power varies for a given engine speed based on the output voltage. In the illustrated embodiment, there is a single peak power point at each engine speed. In particular, at each engine speed there is an output voltage at which a maximum output power is achieved, and the voltage is not the same for every engine speed. As such, in one embodiment, power deliverable by AC power source 22 is maximized for a single load matched output voltage at each engine speed. In one embodiment, the different peak power points are achieved due to high armature leakage inductance of AC power source 22 that results in a large DC-side output impedance of power boost regulator 24, thereby causing the power deliverable by AC power source 22 at a given engine speed to be maximized for a single load-matched output voltage. Accordingly, power boost regulator 24 is capable of performing load matched voltage operation and adjusting its operating voltage to allow for maximum power production at each engine speed.

An exemplary maximum power curve 126 of FIG. 6 intersects each peak power point of power curves 112-124 for the illustrated engine speeds, while maximum power curve 102 of FIG. 5 illustrates exemplary maximum power points for all engine speeds. Maximum power curves 126 (FIG. 6) and 102 (FIG. 5) thereby illustrate the additional power that is available for capture and storage across the engine speed range as compared to a conventional power generator depicted by curve 104 of FIG. 5.

At each engine speed, there is also an output voltage above which the output current (and therefore output power) of AC power source 22 becomes zero, referred to herein as the open circuit current. In some embodiments, this output voltage for each engine speed corresponds to the peak of the line-to-line emf voltage above which rectification diodes of power boost regulator 24 do not conduct electricity. The curves of FIGS. 5 and 6 are exemplary curves according to one embodiment. Different embodiments of power boost regulator 24 may provide different shaped curves depending on the configuration of power boost regulator 24 and the AC power source 22.

Figure 7:
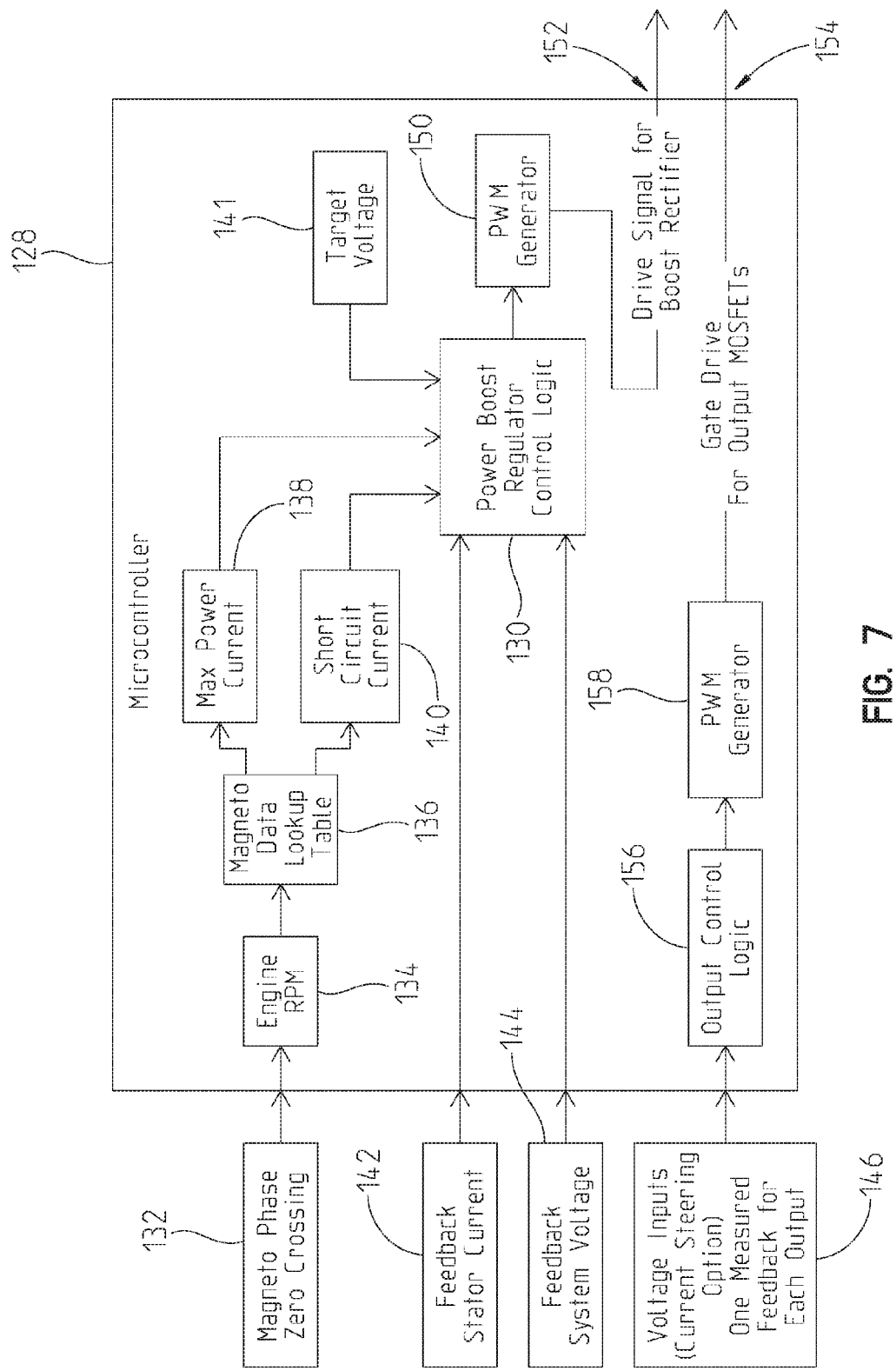
FIG. 7 is a diagrammatical view of inputs and outputs of an electronic controller for controlling the power boost regulator of FIG. 1 according to some embodiments.

FIG. 7 illustrates an electronic controller 128, illustratively a microcontroller 128, for controlling power boost regulator 24 of FIG. 1. In one embodiment, microcontroller 128 is a component of electronic controller 12 of FIG. 1 and communicates with the ECU and other control unit(s) of electronic controller 12 (e.g., via CAN or other communication protocol). Microcontroller 128 illustratively includes power boost regulator control logic 130 operative to perform control functionality for power boost regulator 24. Microcontroller 128 determines the stator current based on feedback signals from at least one current sensor 142 at the stator of AC power source 22. Microcontroller 128 determines the system voltage, i.e., the voltage available at the output of power boost regulator 24 for use by electrical loads, based on feedback signals from at least one voltage sensor 144. The measured stator current and measured system voltage are provided as input to control logic 130. Control logic 130 also receives as input a target system voltage 141, which is a constant predetermined value representing the required load voltage.

Microcontroller 128 calculates the engine speed (RPM) 134 based on output from an engine speed sensor 132. In the illustrated embodiment, sensor 132 provides a signal indicative of the zero voltage crossing of each phase of the three-phase magneto (e.g., AC power source 22 of FIG. 1), and microcontroller 128 calculates engine speed 134 based on the zero voltage crossing information. In one embodiment, based on the engine speed 134, microcontroller 128 accesses a magneto data lookup table 136 stored in memory 15 (FIG. 1) to determine a corresponding current value 138 for maximum power for the measured engine speed and a short circuit current value 140 for the measured engine speed. In particular, value 138 is the current level at which AC power source 22 outputs a maximum power for that engine speed. Short circuit current value 140 is the current level at which the stator power goes to zero. Power boost regulator control logic 130 receives as input the maximum power current value 138 and short circuit current value 140 and controls power boost regulator 24 based on these values. Based on the inputs including target voltage 141, max power current 138, short circuit current 140, measured stator current 142, and measured system voltage 144, control logic 130 provides a control output to drive boost rectifier circuit 80 (FIGS. 3 and 4) of power boost regulator 24 such that AC power source 22 (FIG. 1) generates power at the desired voltage and current levels. In the illustrated embodiment, microcontroller 128 includes an internal or external pulse width modulation (PWM) generator 150 that receives a duty cycle command from control logic 130 and thereby outputs a drive signal 152 to drive boost rectifier circuit 80.

In one embodiment, magneto data lookup table 136 is unique to the type and model of AC power source 22 installed in the vehicle. Magneto data lookup table 136 comprises data identifying the power characteristics of AC power source 22 (FIG. 1) of the vehicle for all or multiple engine speeds. For example, lookup table 136 contains current, voltage, and power values corresponding to an entire engine speed range or to a plurality of engine speeds in the range. In one embodiment with lookup table 136 containing power characteristics for a plurality, but not all, engine speeds, controller 12 selects an engine speed available in table 136 that is closest to the measured engine speed for determining the power characteristics. For example, if the measured engine speed is 2250 RPM, and lookup table 136 contains power characteristics for engine speeds of 2150 RPM and 2300 RPM, controller 12 selects 2300 RPM as the "measured" engine speed for purposes of determining the maximum power current 138 and short circuit current 140 of FIG. 7.

Referring still to FIG. 7, in one embodiment output control logic 156 receives voltage inputs 146 comprising the measured voltages at each electrical load or for each electrical load group (e.g., system loads 26, critical loads 28, chassis loads 30 of FIG. 1) of the electrical system. For example, output control logic 156 may receive these inputs when power boost regulator 24 includes the current steering circuit for output stage 84 (FIGS. 3 and 4). In this embodiment, output control logic 156 provides a control output 154 for driving output stage 84 (FIG. 3) to distribute the power based on the priority of the electrical loads, as described herein. In one embodiment, output 154 is generated by an internal or external PWM generator 158 and includes a pulse width modulation (PWM)/gate drive signal for driving MOSFETs of the current steering circuit.

Figure 8:
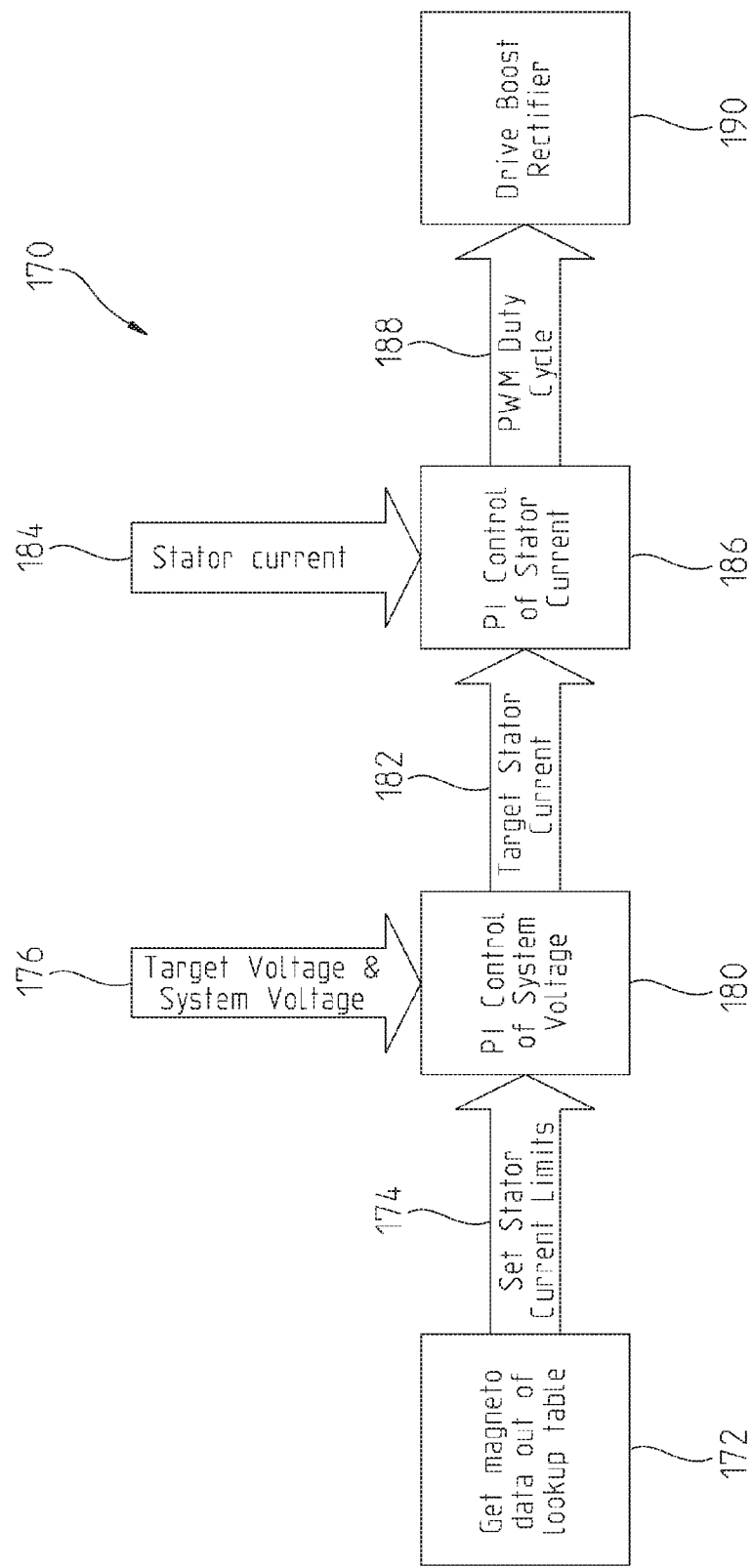
FIG. 8 is a flow diagram illustrating an exemplary method of operation of the electronic controller of FIGS. 1 and 7.

Referring to FIG. 8, a flow diagram 170 illustrates a control method of microcontroller 128 of FIG. 7 for controlling power boost regulator 24 according to an illustrative embodiment. At blocks 172 and 174, microcontroller 128 uses data from magneto lookup table 136 for the measured engine speed to set minimum and maximum current limits of the stator of AC power source 22 (FIG. 1), as described in greater detail herein with respect to FIGS. 9 and 10. At block 180, control logic 130 controls the system voltage, i.e., the load voltage output by power boost regulator 24, with proportional-integral (PI) control based on inputs including the minimum/maximum current limits and the target voltage and measured system voltage (block 176). Control logic 130 further controls the stator current at block 186 with proportional-integral (PI) control based on the target stator current and the measured stator current (block 184). Microcontroller 128 drives the boost rectifier circuit 80 (FIGS. 3 and 4) of power boost regulator 24 to the system voltage and stator current determined at blocks 180, 186 using a pulse width modulation signal (block 188) having an appropriate duty cycle and frequency (e.g., via PWM generator 150 of FIG. 7).

Figure 9:
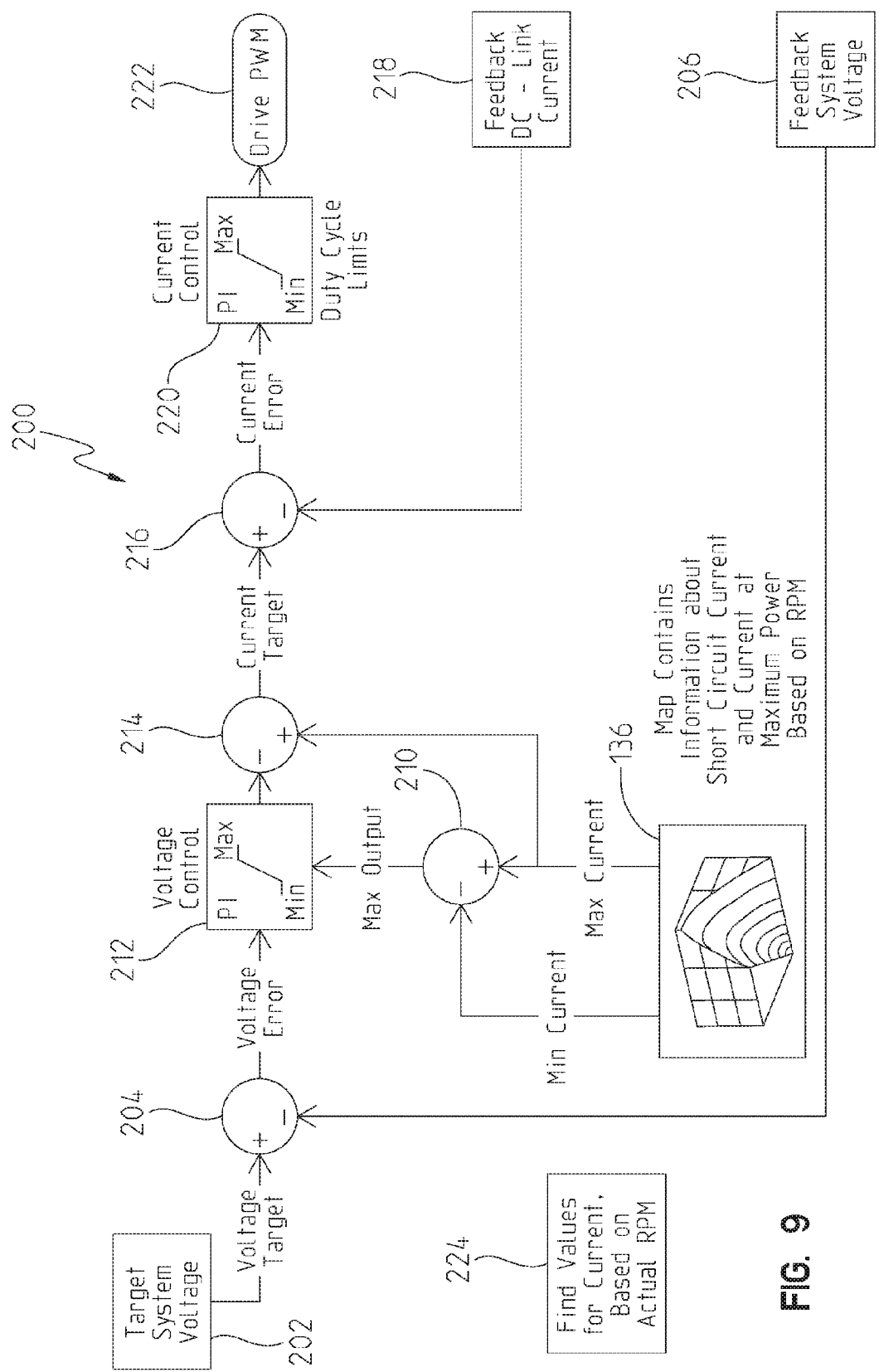
FIG. 9 is a flow diagram illustrating an exemplary detailed method of operation of the electronic controller of FIGS. 1 and 7.
Figure 10:
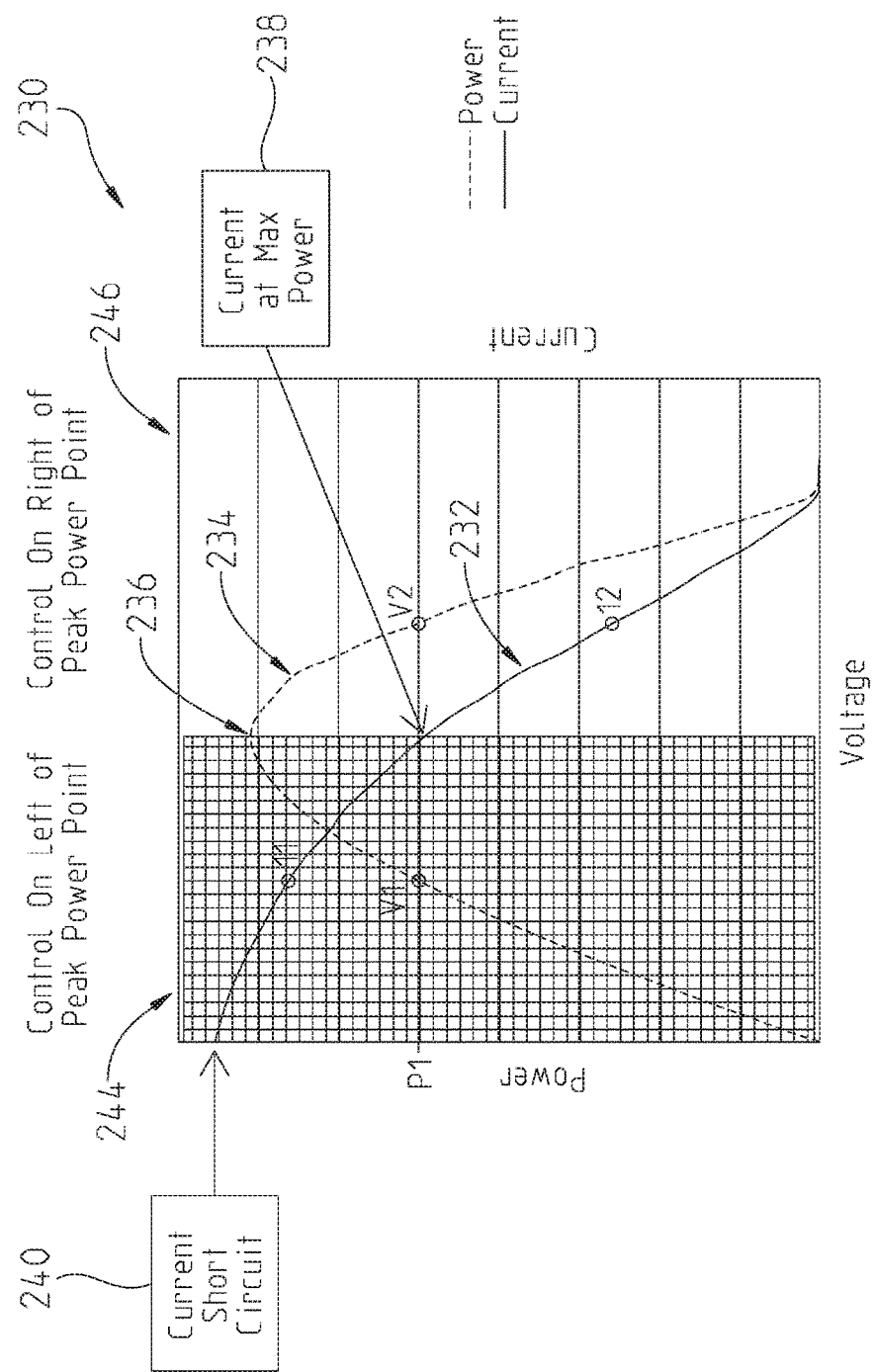
FIG. 10 is a graph illustrating exemplary operating regions of the power boost regulator of FIG. 1 including operating regions to the left and right of the peak power point.

Referring to FIG. 9, a flow diagram 200 illustrates a detailed control method performed by microcontroller 128 of FIG. 7 for controlling power boost regulator 24 according to some embodiments. In the illustrated embodiment, when the power generation system does not operate at the maximum or peak power point, microcontroller 128 is capable of driving power boost regulator 24 to control AC power source 22 (FIG. 1) at one of two operating conditions for each engine speed, referred to herein as left side control strategy and right side control strategy. FIG. 10 illustrates an exemplary power versus voltage curve 234 and a current versus voltage curve 232 for a given engine speed. For any power level (other than maximum power point 236) at the given engine speed, power boost regulator 24 is capable of controlling the output power of AC power source 22 in two different operating points or conditions, including a first voltage/current combination in left side control region 244 (i.e., left of the peak power point 236) and a second voltage/current combination in the right side control region 246. For example, for a power level $P_1$, control logic 130 is operative to control power boost regulator 24 such that the output power $P_1$ of AC power source 22 is achieved with a first voltage $V_1$ and current $I_1$ combination or a second voltage $V_2$ and current $I_2$ combination. $V_1$, $I_1$ is in the left side control region 244 and operates at a lower voltage and a higher current, while $V_2$, $I_2$ is in the right side control region 246 and thereby operates at a higher voltage and a lower current.

Control logic 130 of microcontroller 128 determines which region 244, 246 to operate in based on a number of factors. In the illustrated embodiment, power boost regulator 24 normally operates in right-side region 246 as long as hardware limits are not reached. In one embodiment, hardware limits include maximum voltage thresholds of hardware components. For example, an exemplary maximum operating voltage of MOSFET devices may be about 80 volts. When a hardware limit is reached during right-side region 246 control, power boost regulator 24 is operative to switch operation to left-side region 244. In the illustrated embodiment, operation in right-side region 246 results in lower stator temperature and lower internal temperature of power boost regulator 24 due to lower current levels as compared to operation in left-side region 244.

In one embodiment, power boost regulator 24 operates in left-side region 244 during startup, idle, and low engine speed conditions and switches over to right-side control region 246 after the engine speed crosses a speed threshold. In this embodiment, the higher currents and lower voltages in the left-side control region 244 drive the power boost circuit for starting the engine and maintaining suitable power levels during low engine speeds. The engine speed threshold is based at least in part on the stator and flywheel design. An exemplary engine speed threshold in one engine configuration is about 1600 to 1700 RPM, although other suitable thresholds may be provided based on engine design.

In another embodiment, power boost regulator 24 may normally operate in the left side region 244 in certain configurations, such as in the boost (no buck) configuration or the boost-interleaved buck configuration of FIG. 4.

In an alternative implementation wherein power boost regulator 24 does not include a DC/DC conversion stage 82, the number of stator winding turns of AC power source 22 and the output voltage level of AC power source 22 are selected such that the stator open-circuit voltage is always at or below the output voltage level, thereby allowing continuous operation on the right-side region 246 of the stator power curve of FIG. 10 without requiring DC-DC conversion stage 82.

In the illustrated embodiment, operation in the left side region 244 results in lower voltages and higher currents, while operation in right side region 246 results in higher voltages and lower currents for the same power output. In one embodiment, operation in right side region 246 results in lower heat generation in AC power source 22 due to lower stator currents. In one embodiment, operation in right side region 246 results in less shunting and lower generator braking torque on the engine. Control logic 130 is operative to switch between operation regions 244, 246 for each configuration of power boost regulator 24 based on voltage/current limits, other hardware limits, and/or temperature limits being reached. For example, if operating in the left side region 244 and the stator or engine temperature exceeds a temperature threshold, control logic 130 is operative to switch to right side region 246 to reduce the stator current while maintaining the same power output, thereby reducing heat generation by the stator. Similarly, if operating in right side region 246 and hardware limits are reached, control logic 130 is operative to switch to left side region 244 while maintaining the same power output.

When power boost regulator 24 operates in left side control region 244 of FIG. 10, the minimum current level is set (block 174 of FIG. 8) to the current at maximum power 238 for the given engine speed, and the maximum current level (block 174 of FIG. 8) is set to the short circuit current level 240 for the given engine speed. When power boost regulator 24 operates in right side control region 246, the minimum current level is set to zero (open circuit current), and the maximum current level is set to the current at maximum power 238 for the given engine speed.

In method 200 of FIG. 9, control logic 130 determines a voltage error at 204 based on the difference between the target system (load) voltage 202 and the measured system (load) voltage 206. In one embodiment, the target system voltage is fixed and based on the electrical loads. At block 212, control logic 130 commands a target stator voltage via PI control based on the voltage error and the minimum and maximum current levels determined at block 174 of FIG. 8. In particular, the currents from lookup table 136 corresponding to the min/max current levels for the measured engine speed are used as the lower and upper current limits of PI control 212. Control logic 130 at 214 determines the target stator current based on the target stator voltage (i.e., current=power/voltage) and the maximum current level. The maximum current level input to block 214 is the short circuit current when operating in left side control region 244 of FIG. 10 and the maximum power current when operating in the right side control region 246 of FIG. 10, as described herein. At block 216, control logic 130 determines a current error based on the difference between the measured current 218 and the target stator current and commands the stator target current using PI control. In the illustrated embodiment, the target stator voltage and target stator current are commanded using a pulse width modulation generator as described herein.

In the illustrated embodiment, power boost regulator 24 is configured to operate in a plurality of different modes selectable by a user with mode input device 32 of FIG. 1. Referring to FIG. 1, mode input device 32, which may be provided on an instrument cluster, provides a discrete or CAN input signal to electronic controller 12 indicative of the selected mode. One exemplary mode is a plow mode of operation. The plow mode may be used during a work operation of the vehicle, such as when plowing and/or hauling snow, earth, or other material, due to the additional power drawn by the electrical actuator of the plow or work tool. In the plow mode, controller 12 monitors the output voltage and battery charge output percentage of power boost regulator 24 and controls the fuel to injectors 20, the throttle opening percentage, and the clutch control angle of eCVT 18 to achieve higher engine speeds at idle and low vehicle speeds. For example, when the vehicle is idling or moving a low speeds below a predetermined speed threshold in the plow mode, controller 12 speeds up engine 16 and adjusts the transmission ratio accordingly to maintain the proper vehicle speed. The higher engine speed results in additional power output by AC power source 22. In the plow mode, electronic controller 12 communicates a target charging output percentage to power boost regulator 24 (e.g., for charging the vehicle battery) and retrieves or receives the actual charging output percentage from power boost regulator 24. Controller 12 then adjusts the engine speed to provide the required power to achieve the target charging output percentage. For example, if controller 12 calls for 100% charging output and the battery voltage is not at the desired voltage, controller 12 increases the engine RPM such that the battery may be charged to the proper level during the work operation.

Another exemplary mode of operation of power boost regulator 24 is a performance mode. In the performance mode, controller 12 operates power boost regulator 24 to improve the performance (e.g., acceleration) of the vehicle by reducing the load on engine 16 during periods of high acceleration and/or high engine speeds. In one embodiment, electronic controller 12 controls power boost regulator 24 to draw less current from AC power source 22 in response to detecting an acceleration that exceeds a threshold and/or an engine speed that exceeds a threshold. Power boost regulator 24 achieves the reduced current draw by doing one or more of the following: reducing the output voltage on the non-critical output loads (e.g., chassis loads 30 of FIG. 1) via the current steering circuit, removing the output voltage from the chassis loads 30 for an adjustable period of time via the current steering circuit, and/or drawing the power from AC power source 22 at a higher voltage and a smaller current (e.g., switching to operation at right side region 246 of FIG. 10). Other suitable modes of operation may be selected and implemented with power boost regulator 24.

FIGS. 11A-B illustrate a circuit-level view of an exemplary power boost regulator 300 according to an illustrative embodiment. Power boost regulator 300 includes control circuitry 314 for controlling operation of power boost regulator 300, including MOSFETs Q1-Q11. In the illustrated embodiment, control circuitry 314 includes microcontroller 128 of FIG. 7 that controls functionality of and measures characteristics of power boost regulator 300. Control circuitry 314 further includes voltage dividers for feedback signals, current measurement circuits, temperature measurement circuits, magneto phase level signal detectors, and other suitable control circuitry, such as the input/output devices illustrated in FIG. 7. An exemplary boost rectifier circuit 304 corresponding to input stage 80 of FIG. 3 is coupled to the output of a three-phase stator 302 of AC power source 22 (FIG. 1). Boost rectifier 304 includes a bridge rectifier comprising MOSFET devices Q1-Q6 driven by controller 12 (e.g., PWM generator 150 of FIG. 7) for causing stator 302 to see its RPM dependent load matched voltage and to produce the target power levels at the desired voltage and current combinations. Resistors R2, R3 are coupled in series with the three phase output of stator 302 for measuring inductor current of stator 302, and another current sensing resister R1 is coupled at the output of boost rectifier 304. In one embodiment, MOSFET devices Q1-Q11 of power boost regulator 300 of FIGS. 11A-B are low loss switching MOSFETs.

Power boost regulator 300 illustratively includes a DC-DC buck converter circuit 306 including a pair of MOSFETs Q10, Q11, an inductor L1, and a capacitor C6. MOSFETs Q10, Q11 are driven by the PWM generator to provide open loop DC-DC conversion control. In one embodiment, buck converter circuit 306 runs different fixed PWM duty cycles to improve efficiency and reduce the likelihood of high boost ratios. In one embodiment, buck converter circuit 306 reduces the DC power supply to the proper point when the supply exceeds the required load. In one embodiment, the power boost regulator 300 with DC-DC buck converter circuit 306 normally operates in the right side region 246 of FIG. 10 unless hardware or temperature limits are reached.

In an exemplary operation, MOSFETs Q10, Q11 are operated in complementary fashion at a fixed frequency and duty cycle in order to step down a higher voltage across C6 to a lower voltage on the output of the buck section 306. Complementary operation means that Q10 and Q11 are never both turned on simultaneously. The duty cycle is set to the desired step-down ratio, i.e., operation of Q10 at 25% duty cycle and complementary operation of Q11 at 75% duty cycle results in a buck section output voltage that is 25% of the input voltage. In one embodiment, the frequency of MOSFET activation and the inductance are selected to reduce current ripple in the inductor L1.

Power boost regulator 300 further includes a current steering circuit 308 coupled to the output of buck converter circuit 306 (or the output of boost rectifier 304 if circuit 306 is not used). Current steering circuit 308 is operative to distribute power to multiple output loads based on a priority schedule. For example, referring to FIG. 12, several exemplary load devices 440 are coupled to the output of power boost regulator 24 and have a preconfigured priority. An engine control unit (ECU) 400 is driven by a 16 VDC power and controls fuel injection 410 (injectors 20 of FIG. 1), engine throttle, and engine ignition 412 and monitors engine parameters via engine sensors 414. In the illustrated embodiment, ECU 400 has the highest priority for current steering circuit 308 of FIGS. 11A-B so that the engine can be run properly during periods of limited electrical power. Engine fuel pump 418 and a relay 419 illustratively have the next highest priority, and relay 419 routes power to headlights 424 and instrumentation 432. Engine loads 402 illustratively have the next highest priority for current steering circuit 308 and receive 14 VDC power for an engine oil pump 416 and an exhaust valve actuator 420 and other suitable loads classified as having the next highest priority for engine operation. Exhaust valve actuator 420 controls the position of exhaust valves on the engine. Chassis loads 406 have the next highest priority and receive 14 VDC power for various vehicle loads including taillights 422, handwarmers 426 (if equipped), accessory (ACC) power 428 (e.g., connected to other non-essential accessory loads), battery charging 430, and other suitable chassis loads that are not critical to proper engine operation. In one embodiment, the above priority scheme allows the headlights and hand-warmers to be fully active at engine idle. Other suitable priority schemes may be implemented.

Figure 12:
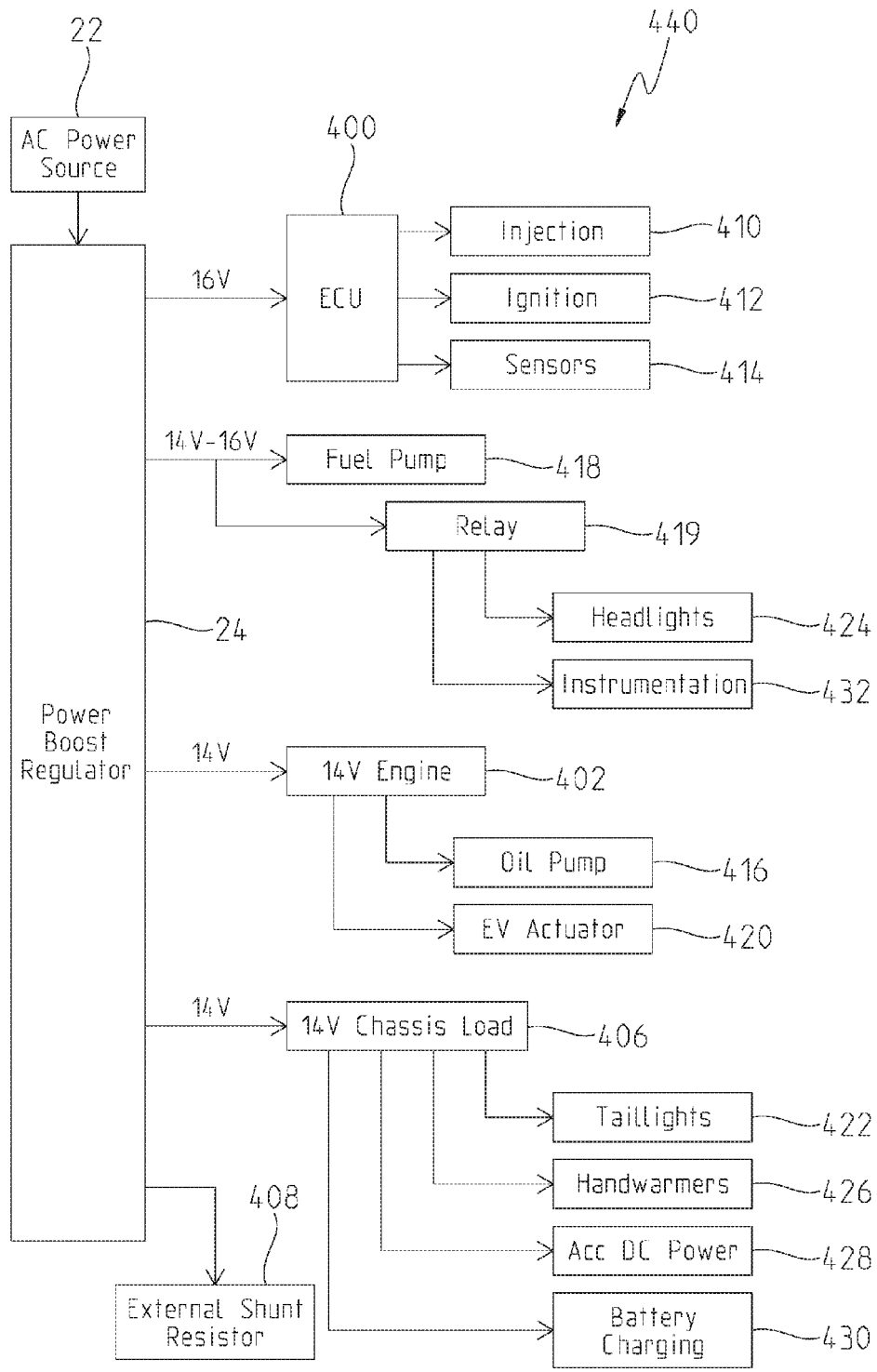
FIG. 12 is a diagrammatical view of exemplary electrical loads of the system of FIG. 1 for power distribution by the power/current steering stage of FIG. 11A-B.

Current steering circuit 308 of FIGS. 11A-B includes MOSFETs Q7-Q9, diodes D1-D5, and capacitors C1-05 that cooperate to control the priority of power delivery to the electrical loads. In the illustrated embodiment, control circuitry 314 is preconfigured to control current steering circuit 308 according to the desired power distribution hierarchy. Referring to FIG. 12, in one embodiment current steering circuit 308 always delivers first available power to ECU 400. If the power received by ECU 400 meets the demand (e.g., 16 VDC), current steering circuit 308 switches on power to critical loads including fuel pump 418 and relay 419 (FIG. 12). If power received by fuel pump 418 and relay 419 meets demand (e.g., 14-16 VDC), current steering circuit 308 switches on power to engine loads 402 (FIG. 12). If power received by engine loads 402 meets demand (e.g., 14 VDC), current steering circuit 308 switches on power to chassis loads 406 (FIG. 12). In one embodiment, after meeting the power requirements for each load 440, excess power from power boost regulator 24 is routed to an external shunt resistor 408 for dissipation. If power output is limited during engine operation, current steering circuit 308 drops power to the loads in order of least priority to improve the likelihood of maintaining proper engine operation, i.e., switches off power to chassis load 406 first, followed by engine loads 402, etc.

Figure 28:
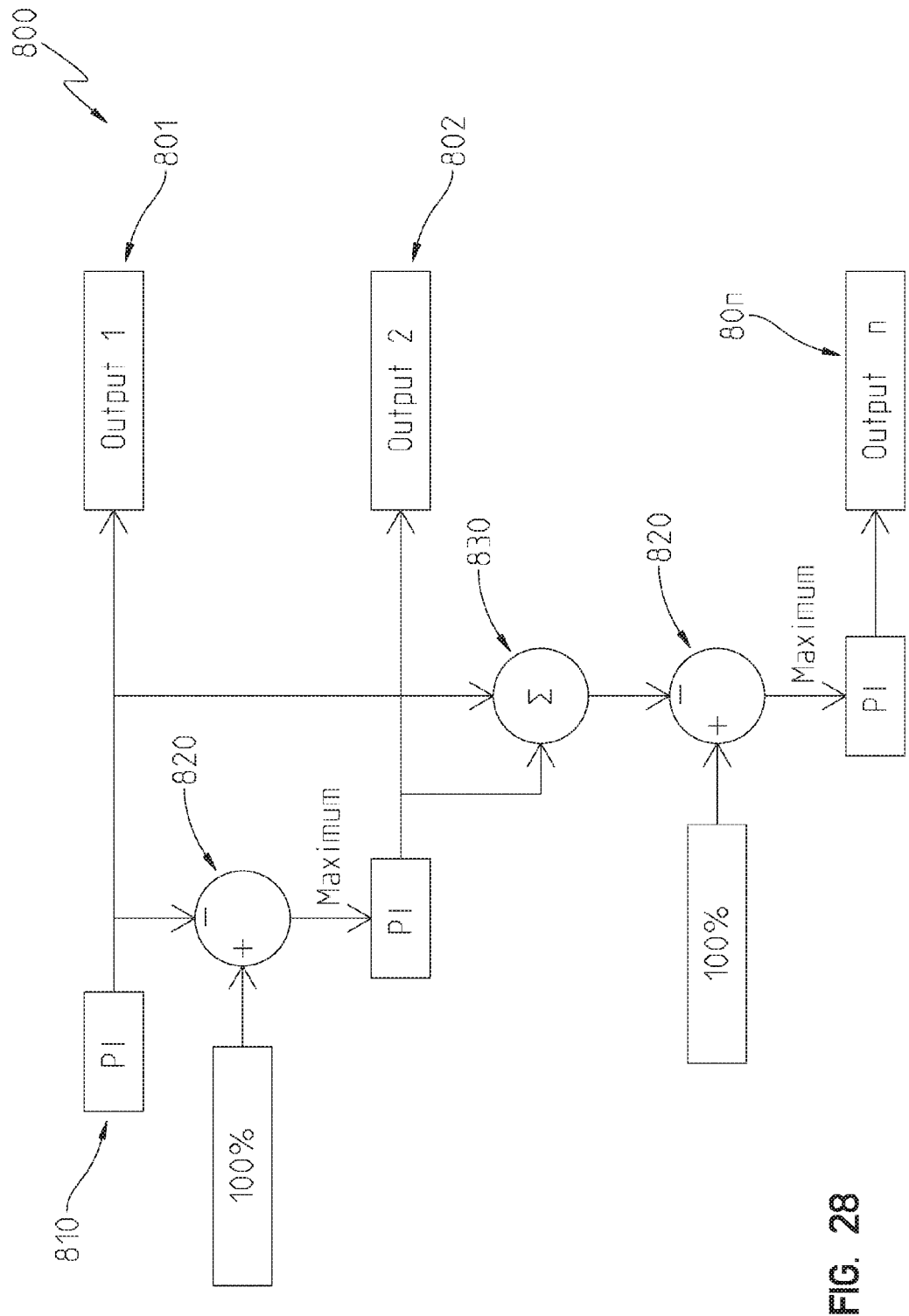
FIG. 28 is a schematic view showing operation of power output prioritization.
Figure 29:
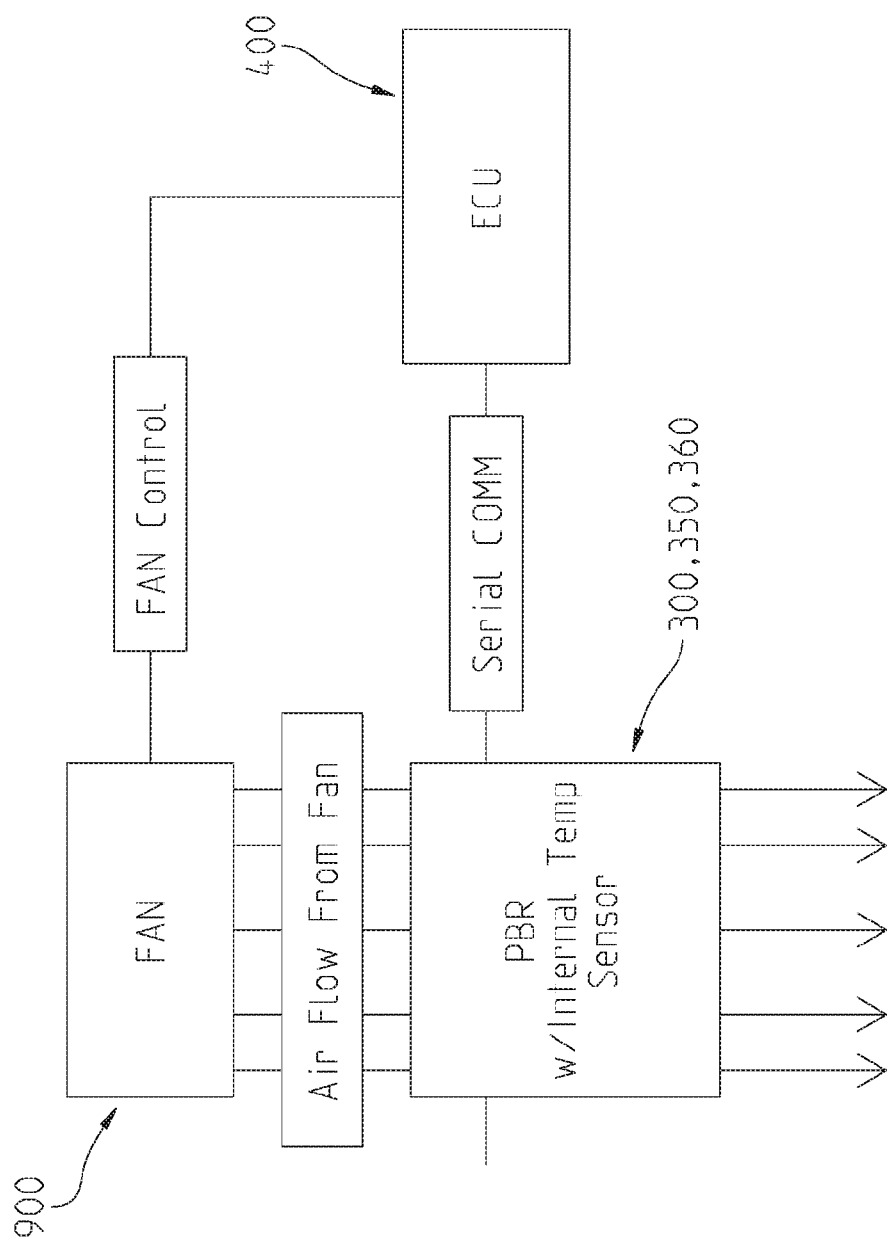
FIG. 29 is a schematic view showing operation of a power boost regulator able to call for cooling.

FIG. 28 schematically illustrates another embodiment system 800 to control multiple voltage outputs based on the priority of power delivery to the electrical loads. The loads are illustrated as outputs 1-n (801, 802, 80n). Furthermore, the outputs represent pulse-width modulation duty cycles where an output receives a percentage of the full cycle or period. In the illustrated case, output one 801 is the output with the highest priority. The full input power (from source 810) is available to output 1, 801. For outputs of lower priority, 2-n (802-80n), the maximum ON-time (pulse-width modulation duty cycle) is the full period less the sum of the ON-times for all outputs of a higher priority (see summer 830). This is represented by the "%" variability pieces 820, 830 of FIG. 28.

During any time that power is delivered to a shunt (such as shunt 408) (shunt time), no power is delivered to the system (AC phases shorted). To control the power delivered to the system the shunt time is adjusted based on the power demand of the outputs 1-n. In the event of a system power demand that exceeds the power capabilities of the source, the voltage (power) from the output with the lowest priority is eliminated first. As such, higher priority components are able to be provided in a stable manner while only low priority functionality is sacrificed, and then only sacrificed when (and to the extent) needed. Still further, a power draining failure on a lower priority component (such as a short in a handgrip heater) does not have the ability to negatively impact operation of higher priority elements such as engine operation.

In one embodiment, power boost regulator 24 is operative to direct pulse width modulation of fuel pump 418, thereby allowing fuel pump 418 pump pressure to be scaled as needed. In one embodiment, fuel pump 418 further serves as a partial power shunt.

In one embodiment, the priorities for power are dynamic. In such an embodiment, the priority for loads is dependent on other factors. In one embodiment, the RPM of the engine is an input in determining the priority for loads. For example, at engine RPM's of less than 1500, chassis loads 30 are prioritized over critical loads 28 for any portions of a duty cycle beyond the absolute minimum needed to supply each load. Alternatively, at engine RPM's of greater than 1500, critical loads 28 (or other loads) are prioritized over chassis loads 30 for any excess portion of a duty cycle (excess portions being those portions not absolutely necessary for minimum viable function of a component.) As one implementation of this, when engine RPM's are below 1500, this represents an idle state. As such, components that serve to propel the vehicle are not being fully utilized. Thus, the duty cycle excess is better served by being made available to chassis loads, such as a load that charges the battery or ultracapacitor.

In the illustrated embodiment of FIGS. 11A-B, power boost regulator 300 provides a wake-up operation for starting the engine. In particular, when the engine is initially rotated for starting via a pull-start or other actuation mechanism, power from stator 302 bypasses boost rectifier stage 304 via the intrinsic diodes (e.g., diode 312, etc.) of MOSFETs Q1-Q6 to build up voltage in capacitor C1. Once the voltage across C1 exceeds a turn-on threshold, control circuitry 314 powers up and begins operating MOSFETs Q1-Q6 of boost rectifier stage 304 based on control commands from microcontroller 128 (FIG. 7).

Figure 26:
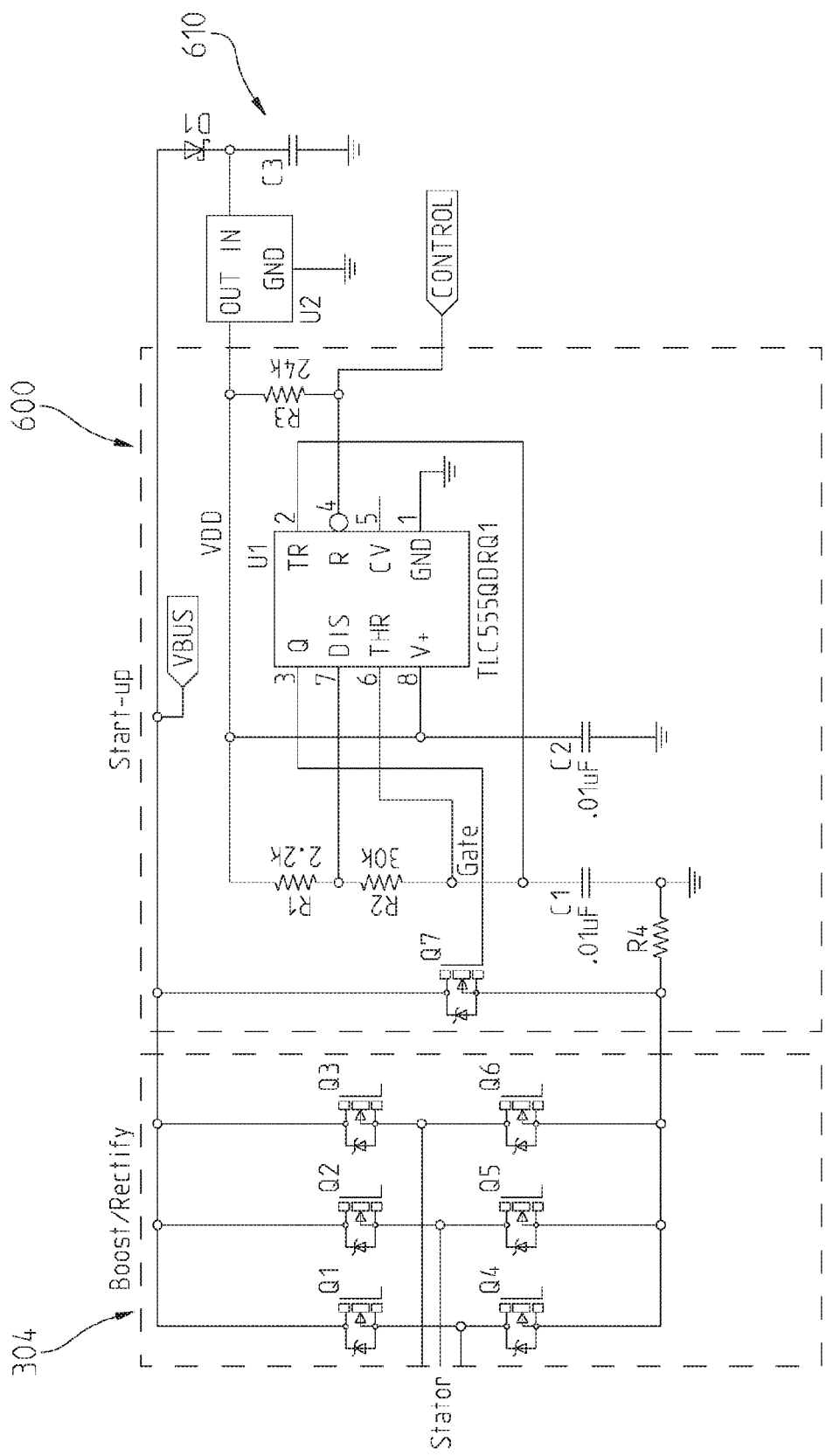
FIG. 26 is a schematic view of an exemplary start-up circuit.

FIG. 26 illustrates a start-up circuit 600. Start-up circuit 600 operates to increase power generation during start-up, thereby improving starting quality. For batteryless systems, voltage regulator 350 is powered via the permanent magnet magneto 22 output during engine start. Body diodes in the Boost/Rectify MOSFETs Q1-Q6, 304, rectify the AC voltage from the stator to produce power. Output power can be increased by periodic shunting of the stator output. While shunted, the stator current builds up so that when the shunting stops, the higher current is delivered, charging capacitor C3 (610). It should be appreciated that the shown circuit is operable to shunt the stator with voltage of less than 1V. As such, the provided circuit is able to operate at a relatively low voltage. This ability allows starting the regulator 350 and engine at a lower voltage than would otherwise be permitted. This low starting voltage allows for a reduced number of stator turns, which boosts output power at higher RPM. The system overall provides for easier starting.

Again referring to the circuit 600 of FIG. 26, during engine start, the diodes in MOSFETs Q1-Q6 rectify the low AC voltage and charge capacitor C3 through diode D1. IC U2 is a low drop-out voltage regulator. Initially VDD is nearly equal to the voltage across C3. When VDD reaches approximately 0.75V, the U1 oscillator circuit starts operation, connecting GATE to VDD and charging C1. When C1 exceeds a predetermined percentage of VDD, GATE is turned off and pin 7 of U1 is pulled low, discharging C1. When the voltage held by C1 becomes less than a second, lower percentage of VDD, GATE is turned ON, pin 7 becomes high-resistance, and C1 resumes charging, restarting the cycle.

The voltage pulses on the gate of Q7 cause it to cycle on and off. When on, VBUS is grounded, shunting the stator through the diodes of MOSFETS Q1-Q6. When off, VBUS rises to pass current through D1 and charge C3. The start-up circuit 600 is disabled by pulling the CONTROL line low when the voltage across C3 is sufficient for normal operation.

Figure 27:
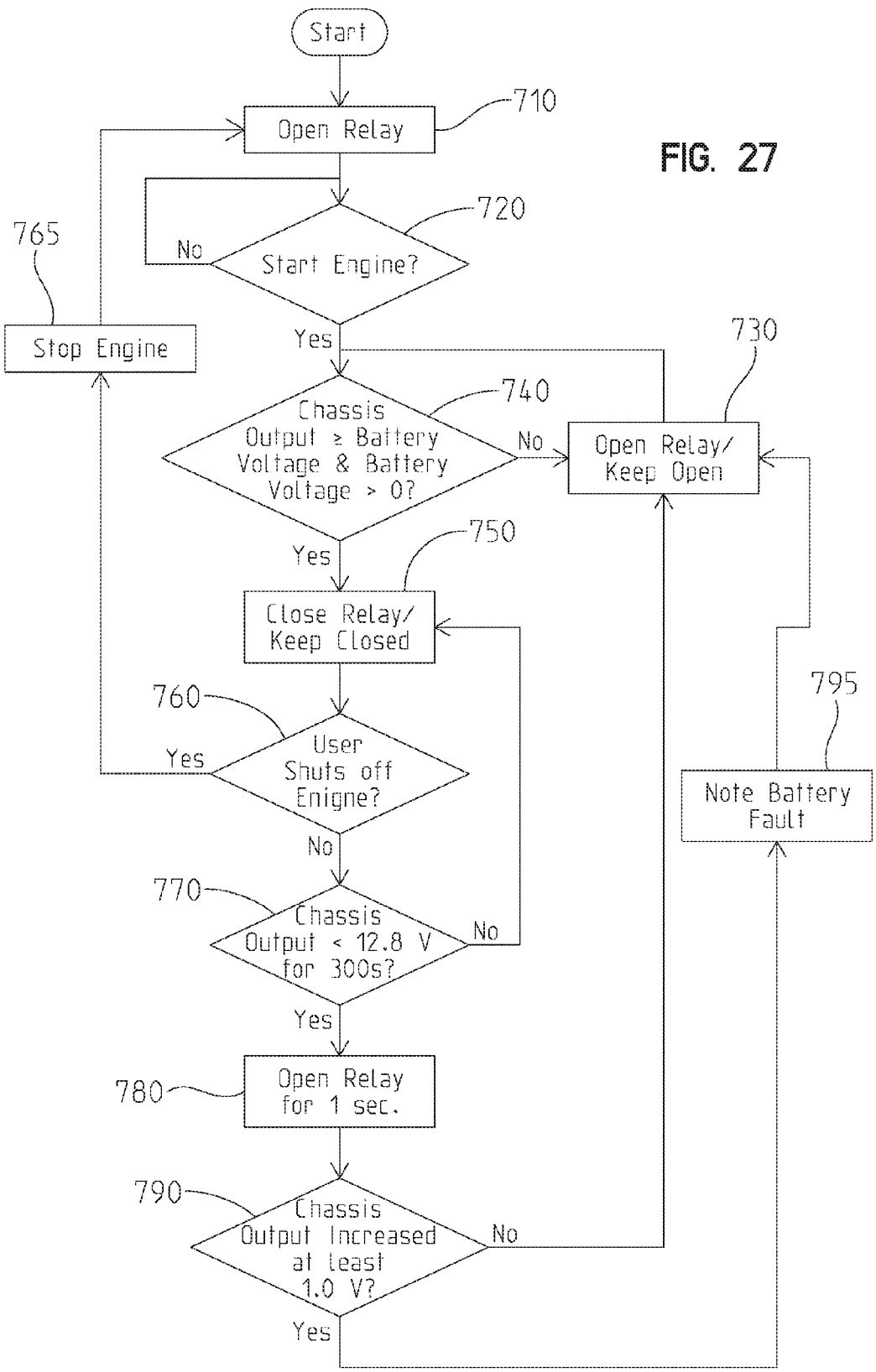
FIG. 27 is a flow chart showing operation of a battery relay.

In certain embodiments, ultracapacitors are used in place of batteries. Ultracapacitors store energy in an electric field rather than a chemical reaction. Ultracapacitors provide the ability to survive many more charging and discharging events than batteries. FIG. 27 illustrates operation of a relay that can be used to control battery charging and that can also support the use of ultracapacitors. Still further, the operation shown in FIG. 27 provides for detection of a failed battery.

In operation, regulator 350 or ECU 400 controls a battery charge relay that selectively couples power to a chassis power output of regulator 350 (which supplies chassis loads 30). The relay has an open state in which chassis loads 30 are disconnected from power and has a closed state in which chassis loads 30 are connected to power. Whenever the vehicle is powered down or the engine is not running, the relay is in the open configuration, block 710. Upon vehicle startup, block 720, the regulator 350 (or ECU 400) receives an indication of battery voltage and chassis power output. These values are received, for example, either by directly measuring them, or via message over CAN.

The relay remains closed after startup, block 730, until chassis power output is greater than or equal to the battery voltage (and the battery voltage is greater than zero), block 730. It should be appreciated that this condition is expected to occur relatively quickly after startup. Once this condition is met, the relay is closed, block 750. Once the relay is closed, power is delivered to the chassis load 30. If the user ever stops the engine, block 760/765, then the relay is opened, block 710 to await the next engine start.

While the relay is closed, the chassis output continues to be monitored. For so long as the Chassis Output does not drop below 12.8V for 300 seconds, block 770, the relay remains closed, block 750. However, if the chassis output drops below 12.8V for 300 seconds, block 770, then the relay is opened for one second, block 780. The chassis output is monitored during that time to see if the chassis voltage recovers quickly in response to the relay opening, block 790. If it does not, then the relay remains open, and the system returns to block 740 to monitor the chassis output and battery voltage to close or open the relay as previously described. If the chassis output voltage recovers by 1.0V or greater at block 790, then it is assumed that the battery is having a harmful effect on the chassis output voltage. Thus, a battery fault is noted and the relay remains open, block 795. As such, chassis loads 30 are not permitted to drain the battery. Still further, a faulty battery is not able to drain power at the expense of chassis loads 30. Finally, because the relay closes as soon as the chassis voltage rises to the battery voltage, there is no current spike therebetween. Such a setup provides for increased life of the electrical components linked by the relay. Also, this relay prevents discharge of the battery or ultracapacitor when the engine is stopped.

Referring to FIGS. 13A-B, another exemplary power boost regulator 350 is illustrated according to an embodiment. Power boost regulator includes a three phase shunt regulator circuit 354 coupled to the output of a stator 352 and an interleaved DC-DC converter buck circuit 356 coupled to the output of circuit 354. A single output stage 358 is illustratively coupled to the output of interleaved buck circuit 356, such as for charging a vehicle battery, for example. Shunt regulator circuit 354 is another exemplary type of boost rectifier circuit, also referred to as a half controlled boost rectifier, with switching elements only on the low side (phase to ground). Control logic 355 of shunt regulator circuit 354 may be provided with a microcontroller, such as microcontroller 128 of FIG. 7, for controlling functionality of circuit 354.

Similar to buck circuit 306 of FIGS. 11A-B, interleaved buck circuit 356 of FIGS. 13A-B is operative to regulate the supply power to the proper point as determined by the load. Interleaved buck circuit 356 is further operative to reduce the amount of ripple in the output current. Each MOSFET switch Q5-Q7 has a respective complementary MOSFET switch Q6-Q8, and the MOSFET switches operate in parallel with inductors L1-L3. In the illustrated embodiment, the duty cycle of the MOSFETs is fixed at 1/n, where n is the number of parallel circuits (illustratively n=3). As such, one high-side MOSFET switch is on at a time, and when one MOSFET switch is turned off another MOSFET switch is turned on. Accordingly, one inductor is connected to the source (e.g., first stage output) at all times resulting in substantially constant input current and a reduction in required source capacitance. Interleaved buck circuit 356 is operative to simultaneously fix the buck duty cycle and provide a constant, regulated output voltage based on the load because voltage regulation is performed by varying the boost section duty cycle.

In one embodiment, the interleaved buck circuit 356 is used for a vehicle with a battery, and the single output 358 routes power for charging the battery. In another embodiment, a current steering circuit, such as circuit 308 of FIGS. 11A-B, is coupled to the output of buck circuit 356 for distributing power to loads of a vehicle with or without a battery.

In the illustrated embodiment, power boost regulator 24 of FIG. 1 (and exemplary regulators 300, 350 of FIGS. 11 and 13) is operative to reduce the amount of shunting required due to the adjustment of the stator voltage at the boost circuit stage. In one embodiment, less shunting results in less heat generated. As described herein, power boost regulator 24 is operative to shunt excess power to external shunt resistor 408 (FIG. 12) such that the output voltage is not higher than the target load voltage. However, such shunting is substantially reduced compared to conventional charging systems due to the ability of power boost regulator 24 to change the voltage at which power is taken from AC power source 22 (FIG. 1) in the boosting circuit.

As an example, in a vehicle requiring 320 W power at 5800 RPM, power boost regulator 24 in one embodiment is operative to match the stator output to the load voltage by causing the stator to run at 109 V at 2.93 amps (A) to achieve the 320 W. However, a conventional power generator system having only shunt type regulation without power boost regulator 24 operates at or below the regulating voltage. For example, the stator in a conventional system may operate at 7 V and 45.7 A to achieve the 320 W power, which is 15 times more current and 240 times more resistive losses than the exemplary operating points provided with power boost regulator 24.

Figure 11C:
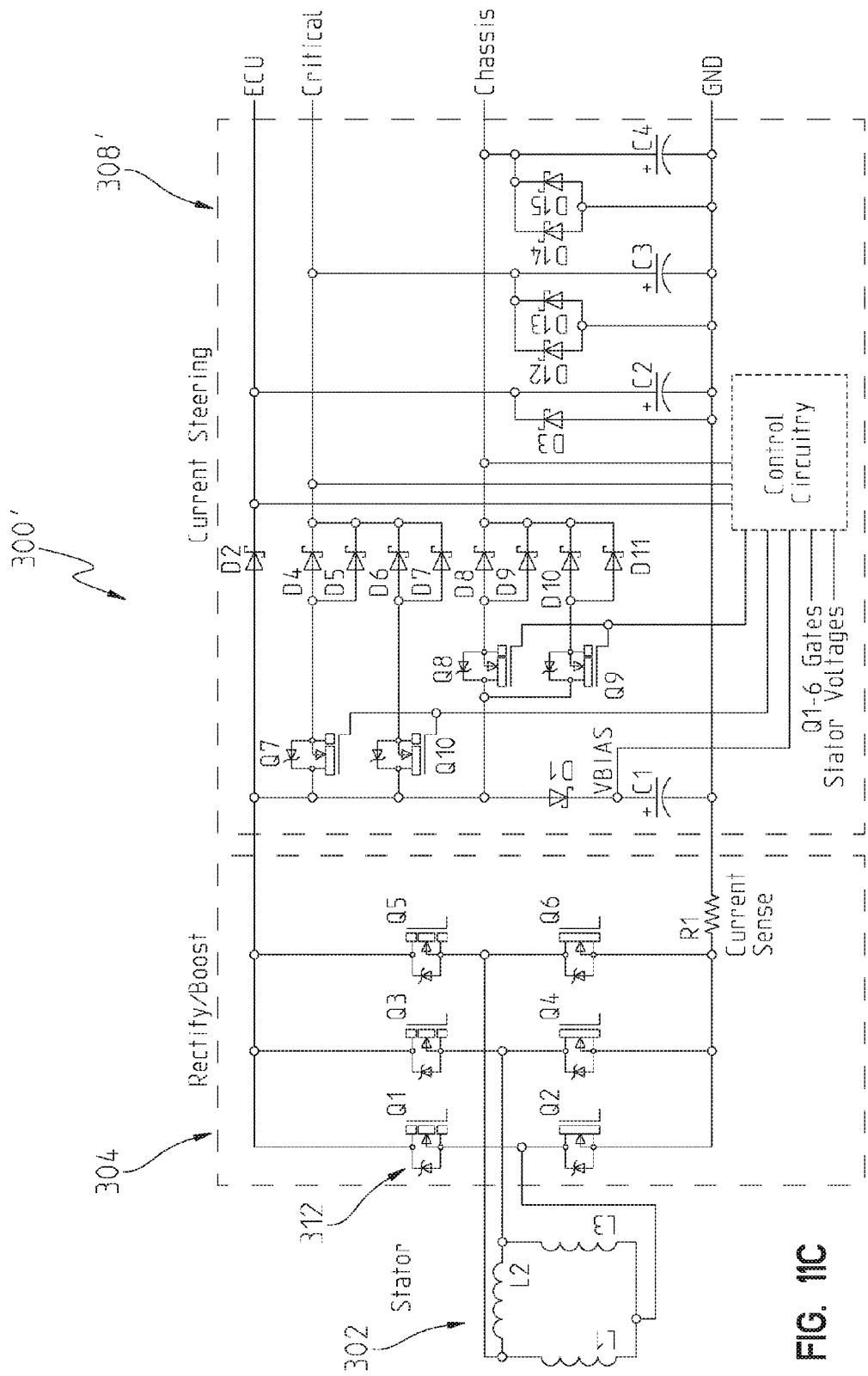
FIG. 11C is a schematic view of another exemplary power boost regulator including a boost rectifier stage and a power/current steering stage.
Figure 10D:
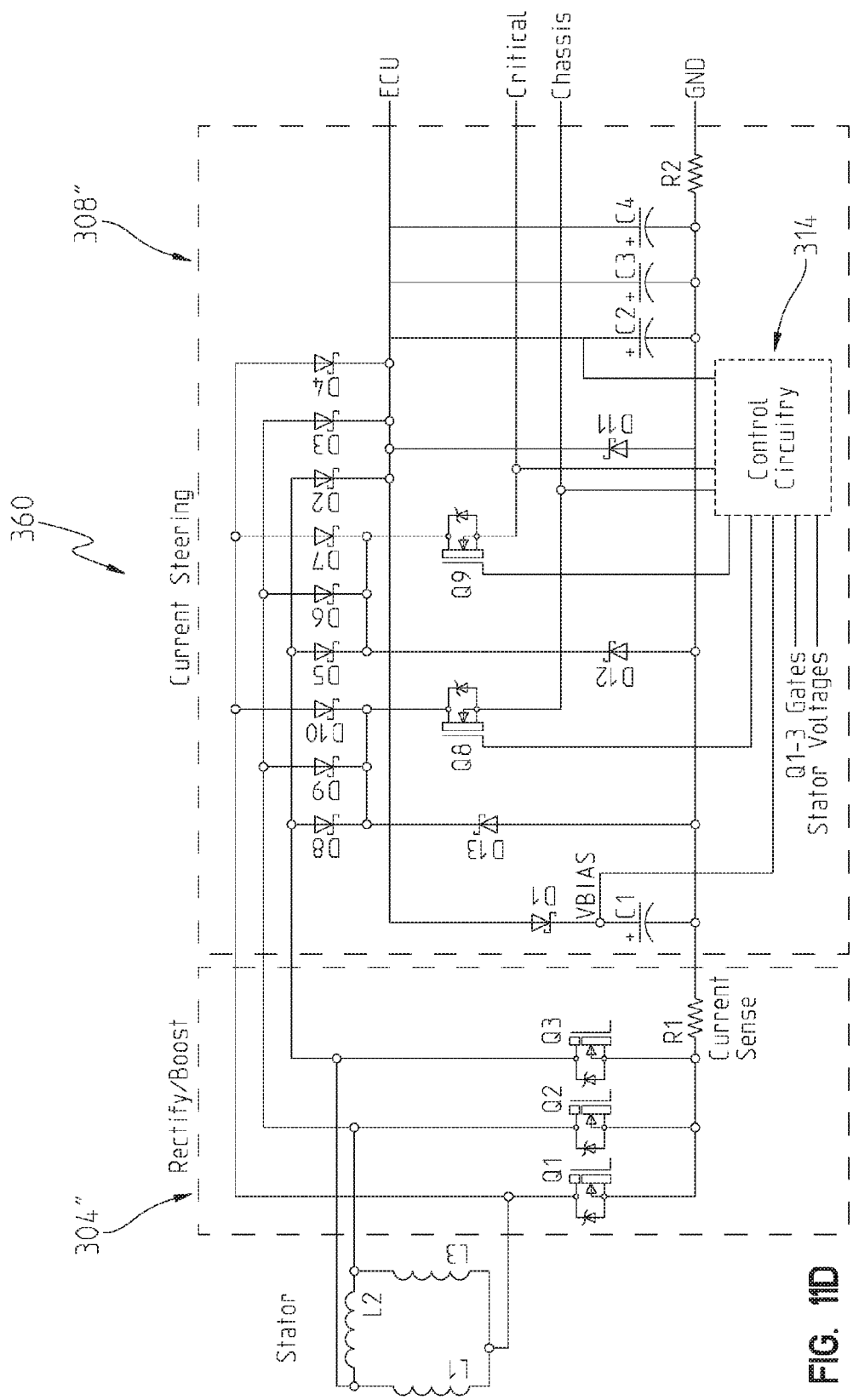

FIG. 11D shows another exemplary regulator 360 that provides reduced part count, reduced heat generation, reduced package size, and reduced complexity relative to regulators 300, 300' of FIGS. 11A-B & 11C. Regulator 360 uses a different rectify/boost stage 304' and provides a different current steering circuit 308" relative to steering circuits 308, 308' of the embodiments of FIGS. 11A-B & 11C. Steering circuit 308" provides the same functionality as steering circuits 308, 308'. Circuit 308" uses less transistors/MOSFETs (Q8, Q9) than circuits 308, 308'. This results in less heat generation and less space needs. Steering circuit 308" shows, as an example, three outputs (to ECU, critical, and chassis loads). However, the design shown in FIGS. 11A-D can be expanded to handle additional loads. Such designs employing the concepts of steering circuit 308" utilize 3*N diodes in the main current paths (D2-10 in the shown example), where N=the number of outputs.

Figure 14:
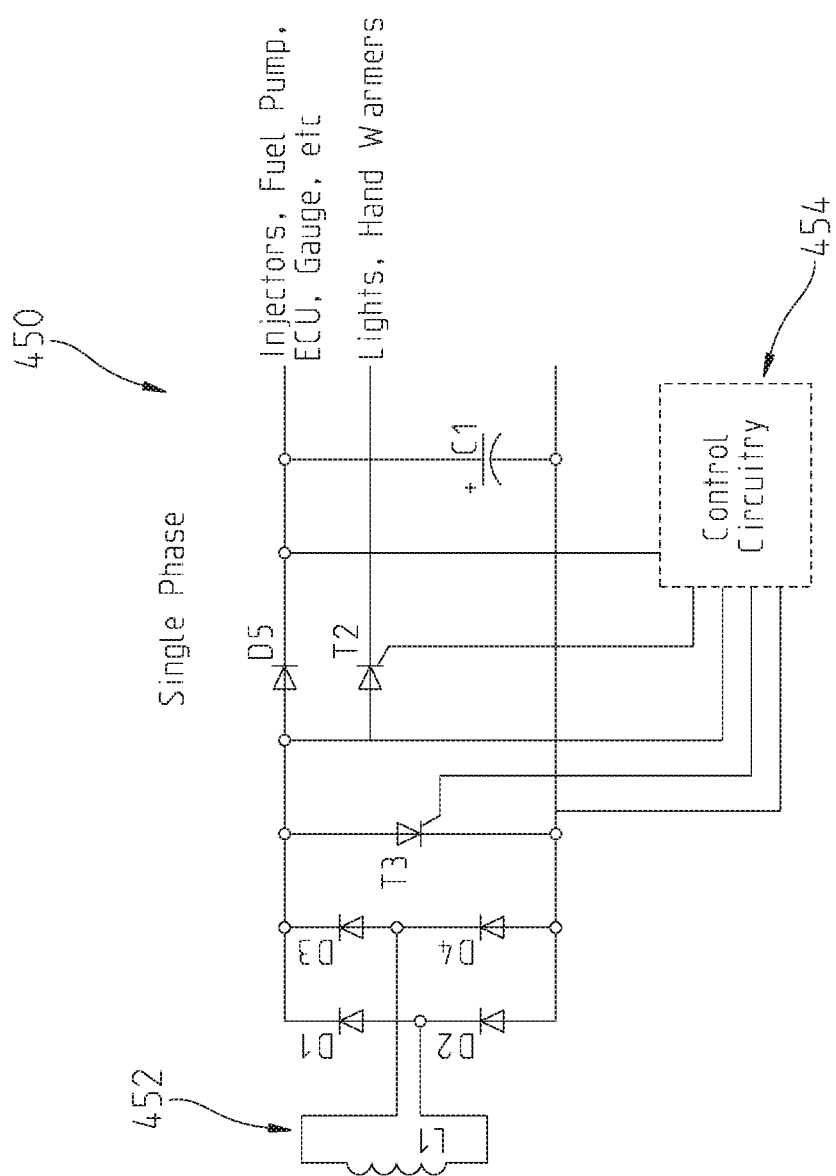
FIG. 14 illustrates an exemplary single phase shunt regulator according to an embodiment.
Figure 15:
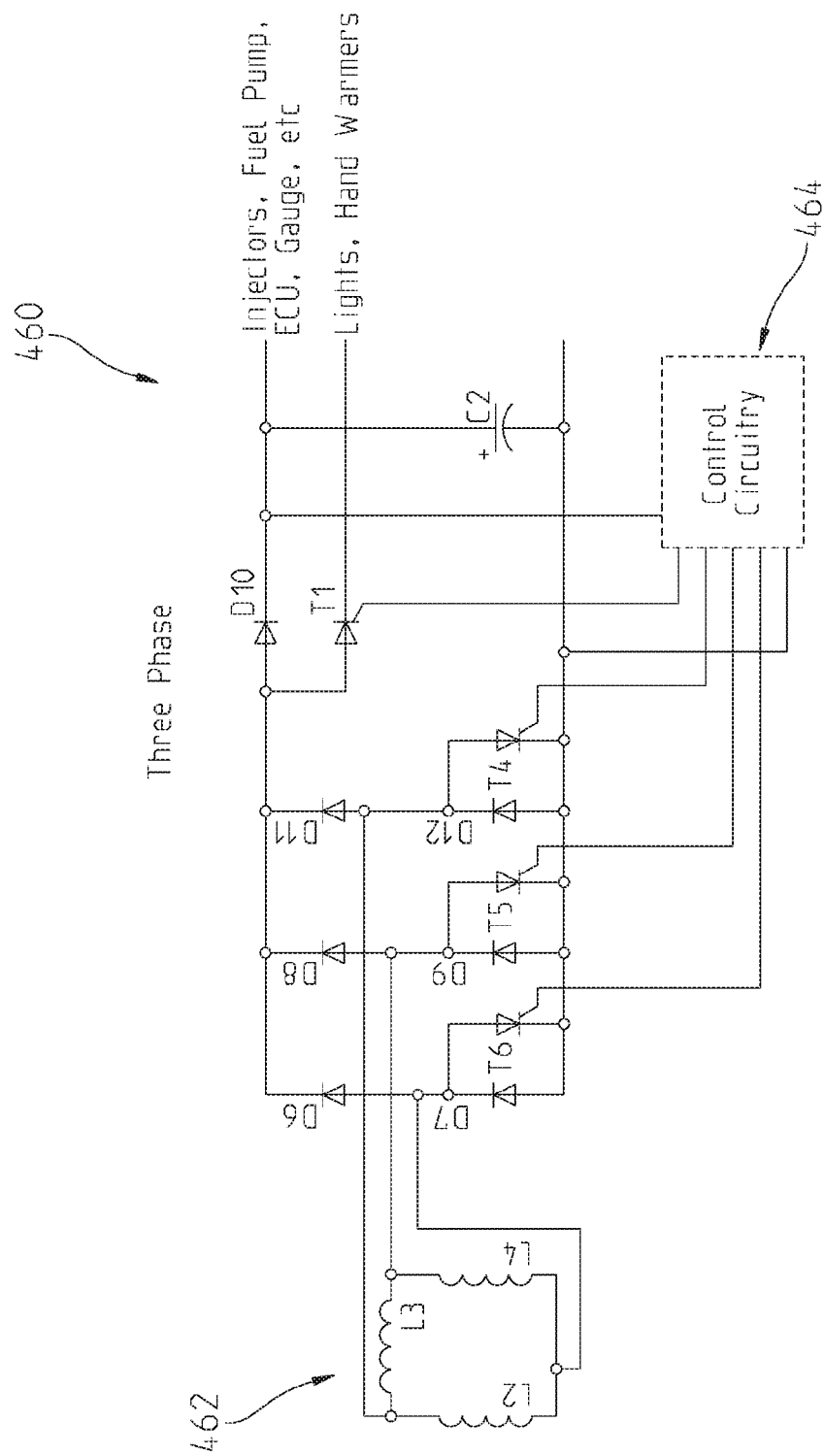
FIG. 15 illustrates an exemplary three-phase shunt regulator according to an embodiment.

Alternative embodiments of a shunt regulator are illustrated in FIGS. 14 and 15. In the embodiments of FIGS. 14 and 15, a shunt regulator 450, 452 is operative to provide regulated voltage to the ECU, fuel injectors, and other critical loads while automatically reducing the voltage applied to non-critical loads such as lights and handwarmers at low engine speeds. A single phase shunt regulator 450 of FIG. 14 includes a full-wave rectifier with diodes D1-D4 and control circuitry 454 that regulates the output of a single phase stator winding 452. A diode T3 is a shunt device operative to shunt excess rectifier output to ground. A capacitor C1 provides a smooth voltage to the critical loads.

Similarly, a three-phase shunt regulator 460 of FIG. 15 includes a three-phase rectifier and control circuitry 464 that regulates the output of a three-phase stator winding 462. The three-phase rectifier is formed with diodes D6-D12, and diodes T4-T6 are shunt devices operative to shunt excess rectifier output to ground. A capacitor C2 provides a smooth voltage to the critical loads.

Figure 16:
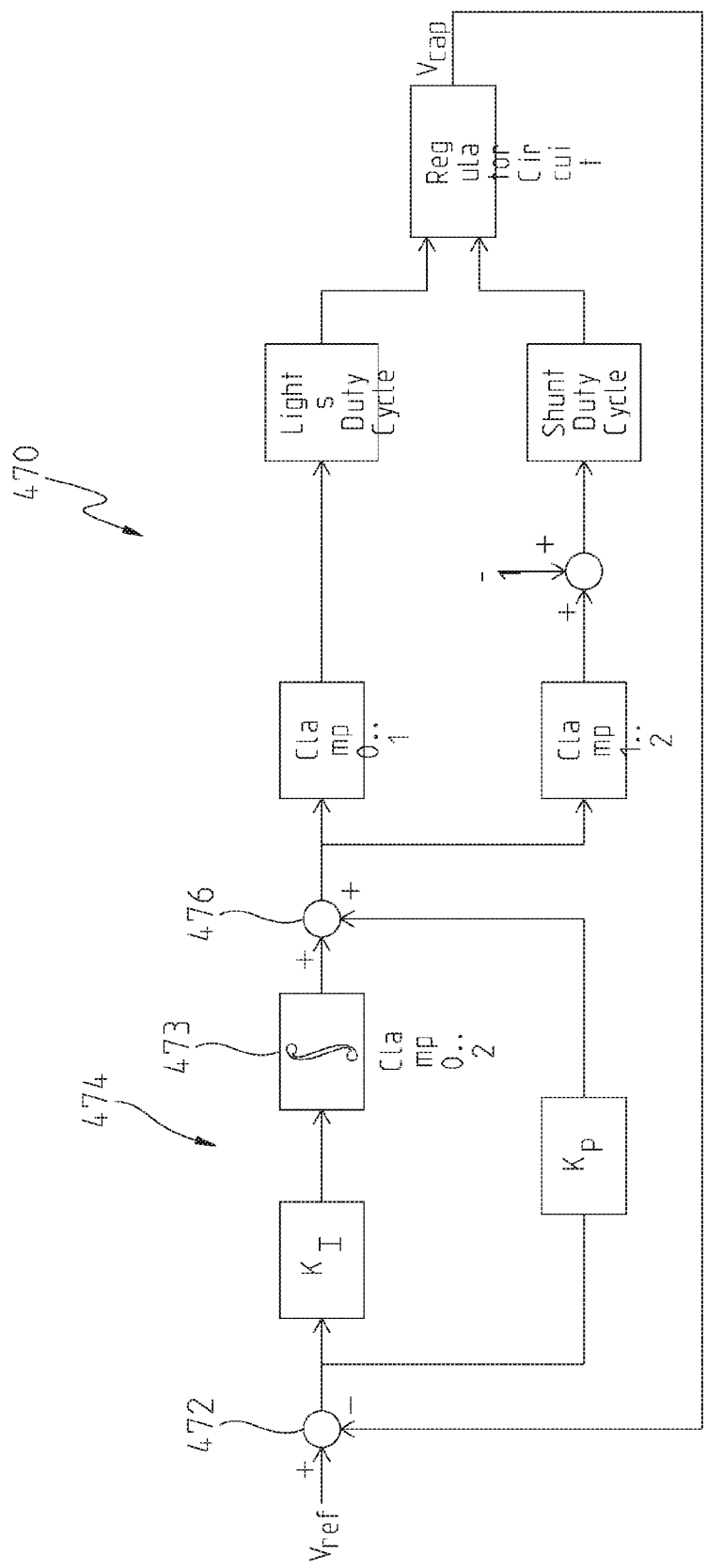
FIG. 16 illustrates an exemplary control scheme for the shunt regulators of FIGS. 14 and 15.

In operation, the percentage on-time of the respective shunt device and the non-essential devices of FIGS. 14 and 15 are adjusted to ensure constant voltage to the essential loads. At low engine speeds, the shunt device remains off and the non-essential device (e.g., light device, handwarmer, etc.) is modulated. When the non-essential device modulation reaches 100%, the shunt device is modulated to continue regulator the essential load voltage. FIG. 16 illustrates an exemplary control scheme 470 for shunt regulators 450, 460 of FIGS. 13 and 14. At block 472, the smoothing capacitor voltage is compared to a reference voltage. Ki, Kp, and the integral block 473 form a standard PI regulator 474. The output range of the integrator of PI regulator 474 is clamped to between zero and two to reduce the likelihood of issues at light and maximum load. The Clamp 0 . . . 1 block outputs the input value if the input is between the limits of zero and one, and otherwise it outputs the closest limit value of zero or one. The Clamp 1 . . . 2 block outputs the input value if the input is between the limits of one and two, and otherwise it outputs the closest limit value of zero or one. The effect is that for control values between zero and one the non-essential devices are modulated while the shunt device stays off, and for control values between one and two the non-essential devices are on 100% of the time and the shunt device stays off. In some embodiments, the control scheme 470 of FIG. 16 is implemented as an analog circuit (e.g., control circuitry 454, 464 of FIGS. 14 and 15) or as software in a microcontroller, for example.

In one embodiment, the shunt is located to dissipate current from the stator to an externally cooled surface, such as a surface of the engine assembly or other surface. In another embodiment, the shunt is located to dissipate current to the surface of the fuel tank of the vehicle.

Figure 24:
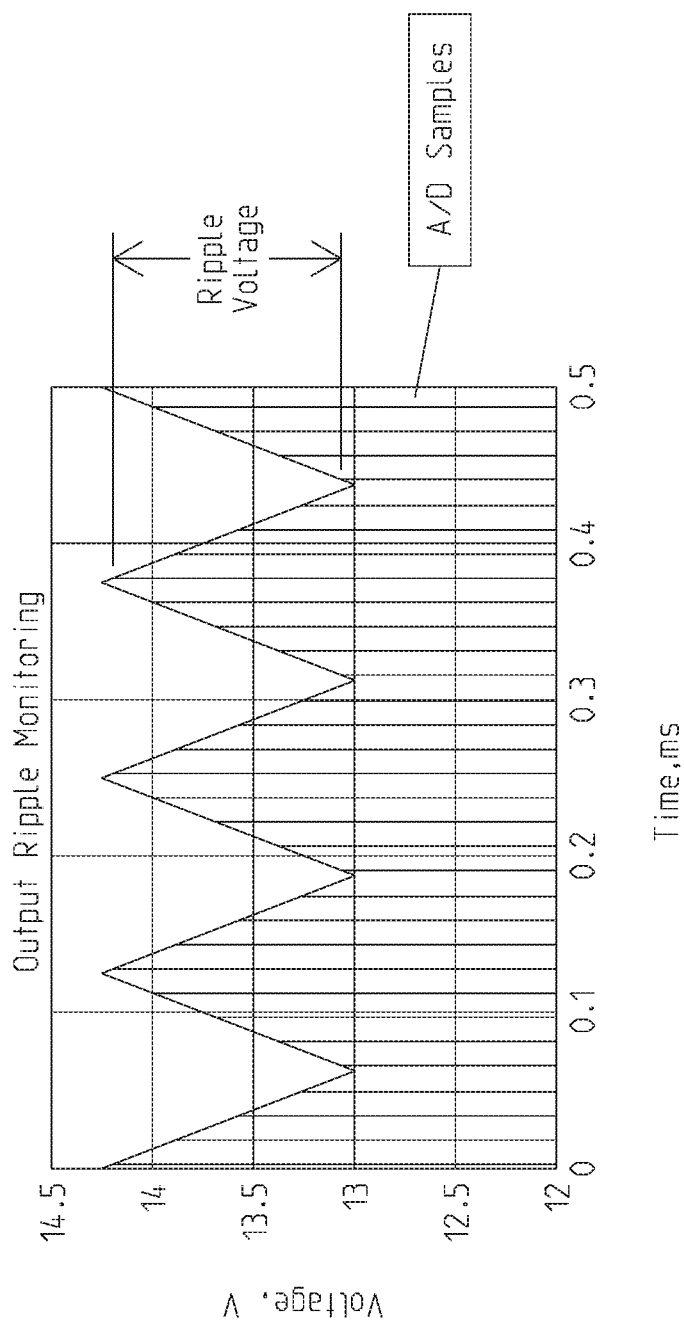
FIG. 24 is a graph showing exemplary voltage output for a power boost regulator.
Figure 25:
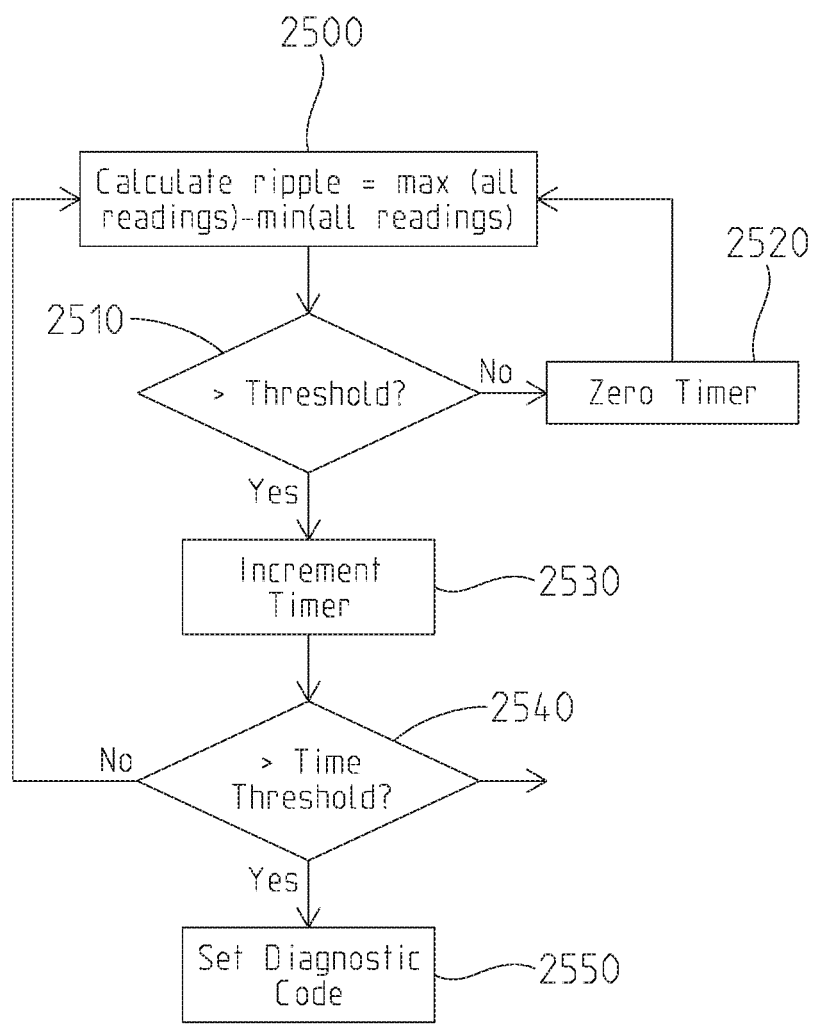
FIG. 25 is a flowchart showing operations performed to assess health of capacitors of the power boost regulator.

Power supplied to outputs (such as ECU, Critical, and Chassis) varies through a pulse width modulation (PWM) cycle. This variability (FIG. 24) is referred to as voltage "ripple." While some ripple is expected, relatively high amount of ripple can negatively impact engine performance. The ripple is calculated by taking multiple readings throughout the PWM cycle and then subtracting the minimum voltage from the maximum voltage, block 2500, FIG. 25. This value is then compared to a threshold of acceptable ripple, block 2510. When the measured ripple is below the threshold (in an acceptable range) the system resets a timer, block 2520, and continues to take readings and monitor the ripple.

The threshold is set to a value where the engine can still operate above the threshold. Such a setting provides that the ripple will exceed the threshold at a point before engine failure occurs. When the ripple exceeds the threshold, the system increments a timer, block 2530, and then checks to see if the timer indicates the passage of a sufficient amount of time, block 2540. This timer check determines if the ripple value is a transient over-threshold ripple or a sustained over-threshold ripple. Again, whenever the ripple is below the magnitude threshold, the timer gets reset, block 2520. When the timer is below a time threshold, the system again measures and calculates the ripple, block 2500. When the timer is above a threshold, thereby establishing a lasting nature to the out of specification ripple, a diagnostic code is triggered indicating trouble, block 2550. This diagnostic code indicates that the ripple is too high for a sustained period of time. This is likely indicative of failure of capacitors within the system that are used to stabilize outputs.

In addition to supplying power to the outputs (ECU, Critical, and Chassis), some amount of power is consumed by the regulator (300, 350, 360) itself. For efficiency, efforts are made to keep such power consumption low. Still further, operational faults can cause increases in power consumption of the regulator (300, 350, 360). With reference to FIG. 11C, in normal operation, C2-C4 have nearly constant voltage, i.e., equal charge is added and then removed each PWM cycle. Thus charge out of the Rectify/Boost stage 304 is fed either to the internal control electronics or one of the outputs. The average current out of the Rectify/Boost stage 304 is the current measured by measuring voltage across resistor R1 multiplied by the percent of time the Rectify/Boost stage 304 is not shunting.

All three outputs share a common ground connection, so the current through resistor R2 is the sum of the current delivered to the three outputs. Any charge delivered by the Rectify/Boost stage 304 and not delivered to the outputs is consumed internally to the regulator 360. This internal current consumption can be calculated from the calculated average Rectify/Boost output and the measured ground current. If this exceeds a predetermined threshold for a predetermined time, a diagnostic code is sent. Earlier detection of an internal power drain increases the likelihood any negative impact caused thereby is lessened.

Such internal power drains are one type of failure or degraded operation of PBR 300, 350, 360. PBR 300, 350, 360 is provided with a serial communication port(s) that provide for serial communication. Due to the PBR 300, 350, 360 having serial communication and the ability to detect internal or external faults of the Charging System. The PBR 300, 350, 360 is able to alert the system that a fault is detected. Thus, in the case of fault detection by the PBR 300, 350, 360, the PBR 300, 350, 360 is be able to react with the following control: 1) Send out diagnostic message that indicates to the system that there is a fault detected. 2) Send out the Diagnostic Message and Limit the chassis output (lowest priority output).

The diagnostic message further indicates a severity level of the detected fault. The system is then able to react in a manner appropriate for the severity of the detected fault. By the way of example, in one embodiment, the following severity levels are used:

Severity level 1: regulator limits Chassis power output (comfort reduced)

Severity level 2: ECU limits engine RPM or vehicle speed (performance reduced)

Severity level 3: ECU or regulator shuts down engine (loss of function)

Figure 17:
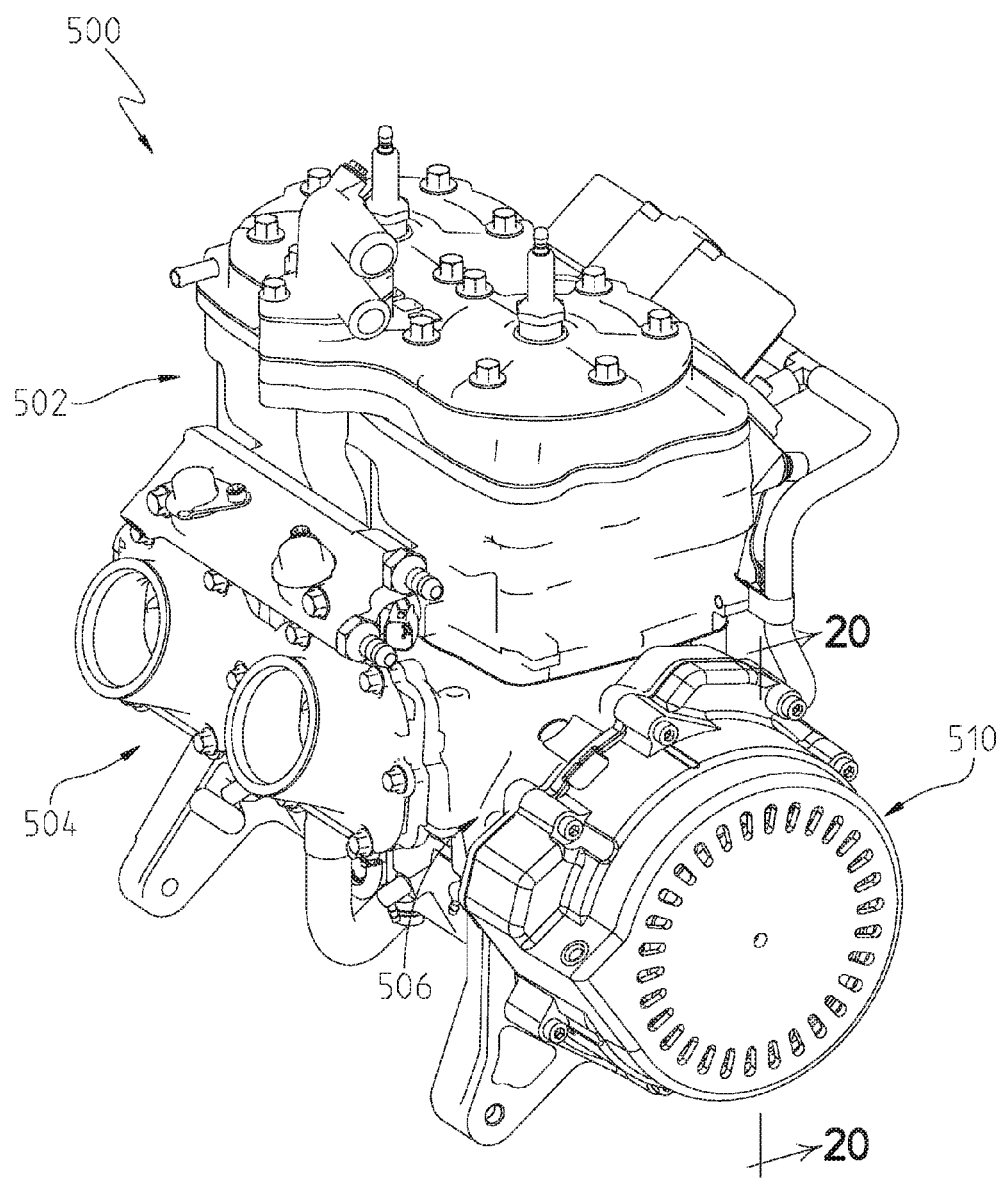
FIG. 17 is a perspective view of an engine according to an embodiment including a power generation assembly.
Figure 18:
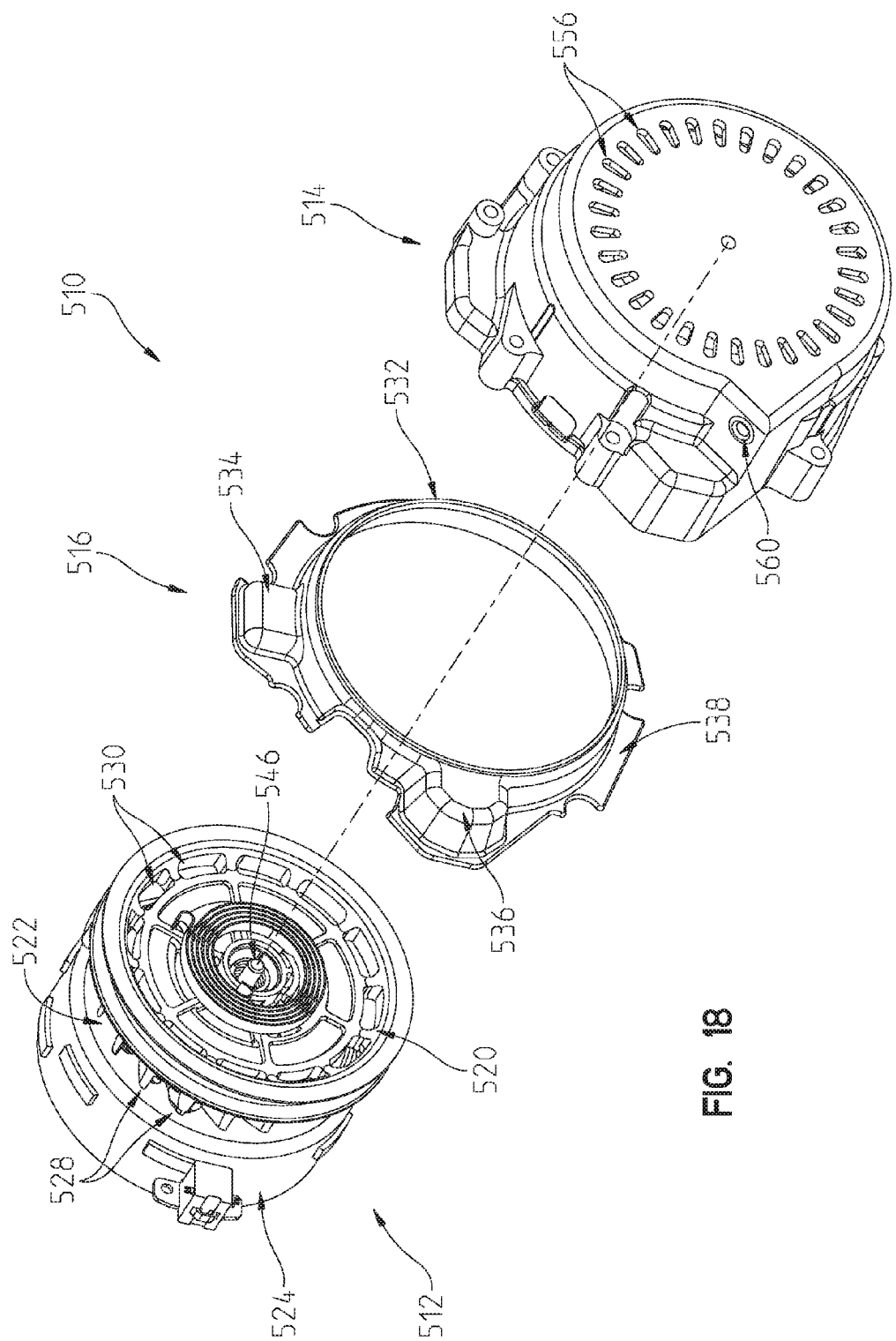
FIG. 18 is a partially exploded perspective view of the power generation assembly of FIG. 17 including a housing, a shroud, and a magneto and starter assembly.
Figure 20:
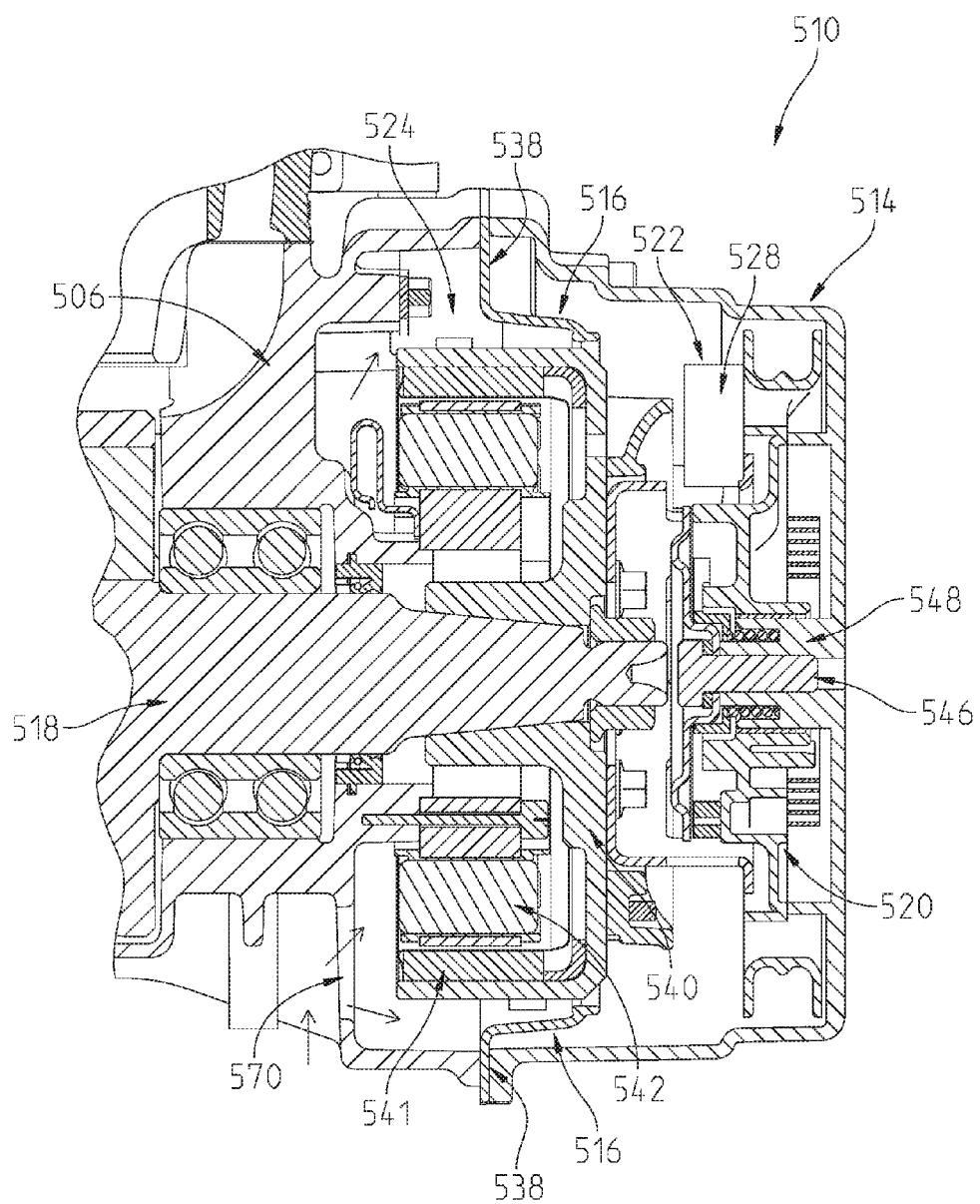
FIG. 20 is a cross-sectional view of the power generation assembly of FIG. 17 taken along lines 4-4 of FIG. 17.

Referring to FIG. 17, an illustrative embodiment of an engine 500 (e.g., engine 16 of FIG. 1) includes an engine head 502 coupled to an engine block 504. A power generation assembly 510 is coupled to a crankcase 506 of engine 500 and driven by the engine crankshaft 518 (FIG. 20). As illustrated in FIG. 18, power generation assembly 510 includes a housing 514, a shroud 516, and a magneto and starter assembly 512. Magneto and starter assembly 512 includes a recoil starter 520, a magneto 524, and a flywheel 522 coupled between magneto 524 and recoil starter 520. Flywheel 522 illustratively includes a plurality of circumferentially spaced blades 528 configured to draw air through the stator of magneto 524 during operation and through circumferentially spaced openings 530 of recoil starter 520. Alternatively, a separate air pump or fan may be coupled to assembly 512 for drawing air through assembly 512.

Certain embodiments of magneto and starter assembly 512 use a plurality of magnets disposed on a flywheel with alternating polarities. Movement of the magneto and starter assembly 512 induce eddy currents due to the relative motion of the magnets and current source. Eddy current losses are proportional to the square of the conductor area. FIG. 23A shows a typical magnet pole having a width W and a length L. In one embodiment, rather than providing a single magnet each magnet pole is divided into multiple pieces, FIG. 23B. The Eddy current power loss for the magnet of FIG. 23A is calculated as Loss=$K*(L*W)^2$. By using three magnets each having a width of ⅓ of W, FIG. 23B, the calculated loss is calculated as Loss=$3*K(L*W/3)^2$. Thus, the loss for the setup of FIG. 23B is ⅓ of the loss for the setup of FIG. 23A.

Power loss manifests itself as heat. Thus reducing the loss reduces the total heat generation and maximum magnet temperature. Magnets have reduced performance at higher temperatures. Reducing power losses in the magnets reduces magnet temperature and thus increases output in steady-state conditions.

Figure 19:
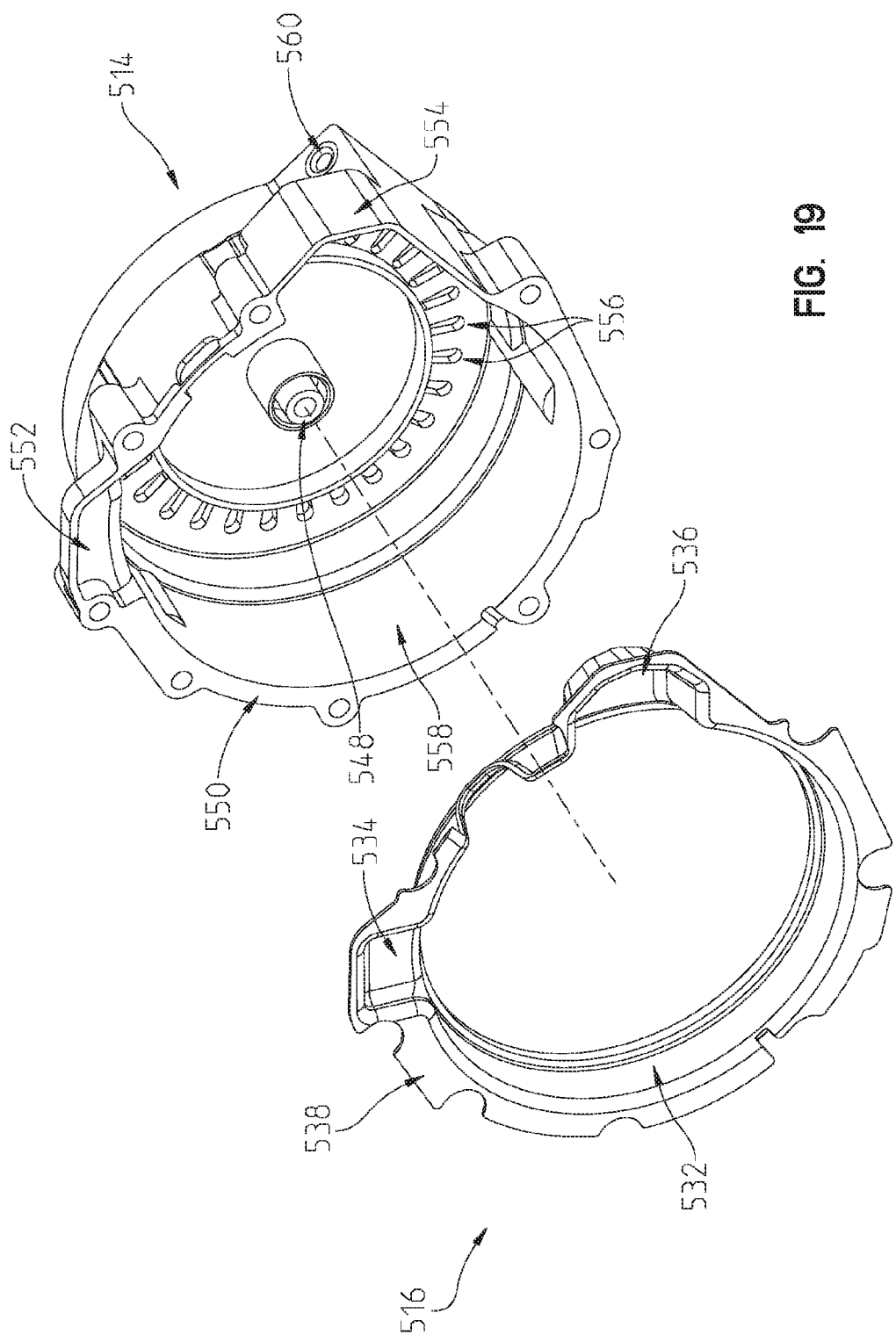
FIG. 19 is an exploded back perspective view of the housing and shroud of FIG. 18.
Figure 22:
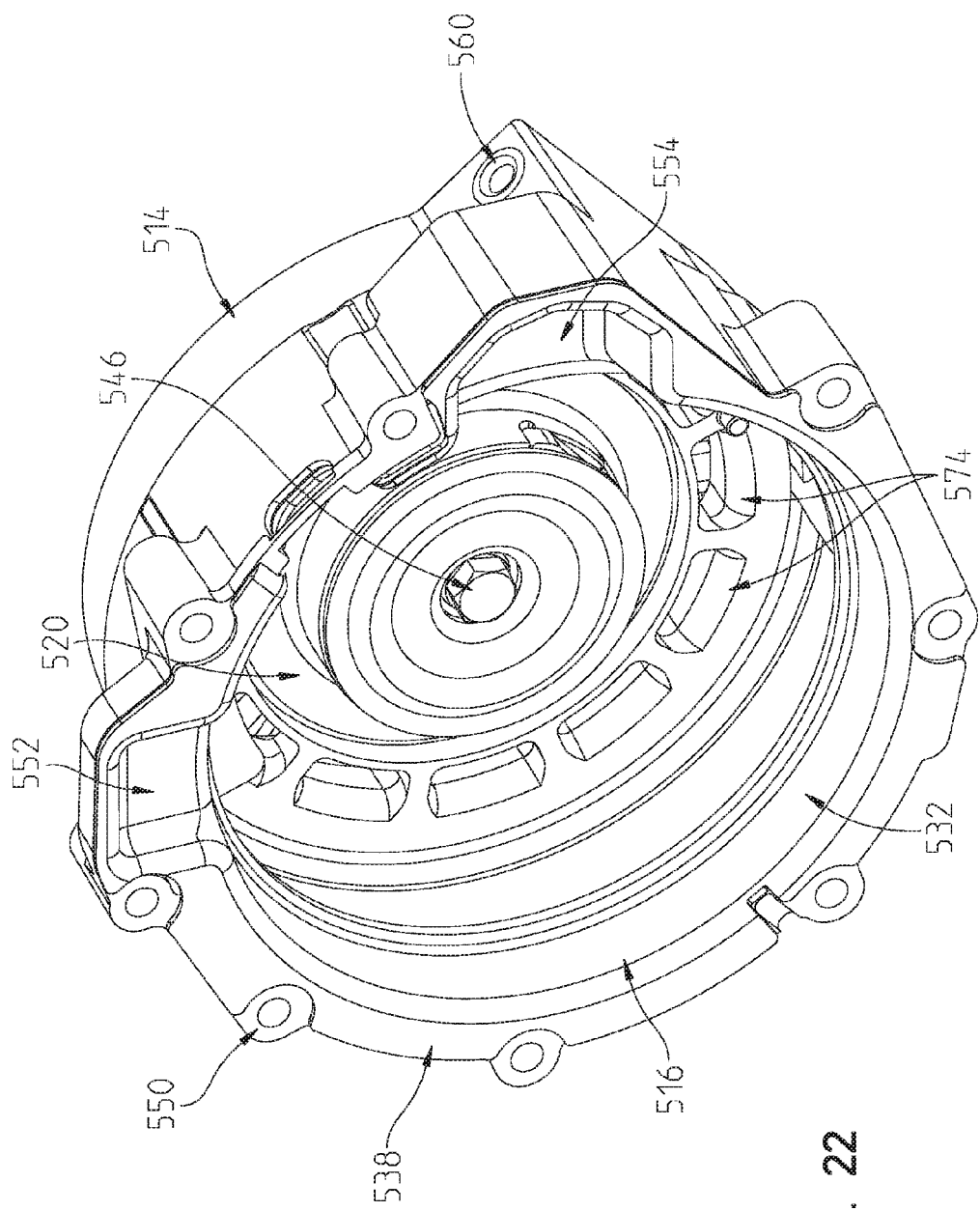
FIG. 22 is a back perspective view of the housing, the shroud, and the recoil starter of FIG. 18.

As illustrated in FIGS. 18, 19, and 22, shroud 516 includes a circumferential wall 532 configured to form a perimeter around flywheel 522. Wall 532 of shroud 516 includes radially extending regions 534, 536 that fit in corresponding cavities 552, 554 of housing 514. A circumferential flange portion 538 of shroud 516 is positioned on end or seat 550 of housing 514 such that flange portion 538 is coupled between housing 514 and crankcase 506 (FIG. 20). In another embodiment, shroud 516 is integral with crankcase 506. Housing 514 includes a plurality of spaced slots or openings 556 extending through the outside cover. An inner wall 558 of housing 514 is substantially cylindrical and forms an opening to receive shroud 516 and magneto and starter assembly 512. FIG. 22 illustrates recoil starter 520 positioned in housing 514 between shroud 516 and the end cover of housing 514. Recoil starter 520 includes a plurality of circumferentially spaced openings 574 configured to route air flow received through flywheel through openings 556 of housing 514. A fastener 546 such as a bolt or screw is threaded through recoil starter 520 and into a bearing assembly 548 of housing 514 such that recoil starter 520 and flywheel 522 may rotate relative to housing 514. An opening 560 in housing 514 is configured to receive a pull-start cord of recoil starter 520. When the cord is pulled, the uncoiling rope spins recoil starter 520 to crank engine 500 (FIG. 17). After the cord is pulled, flywheel 522 keeps spinning and engine 500 starts.

Figure 21:
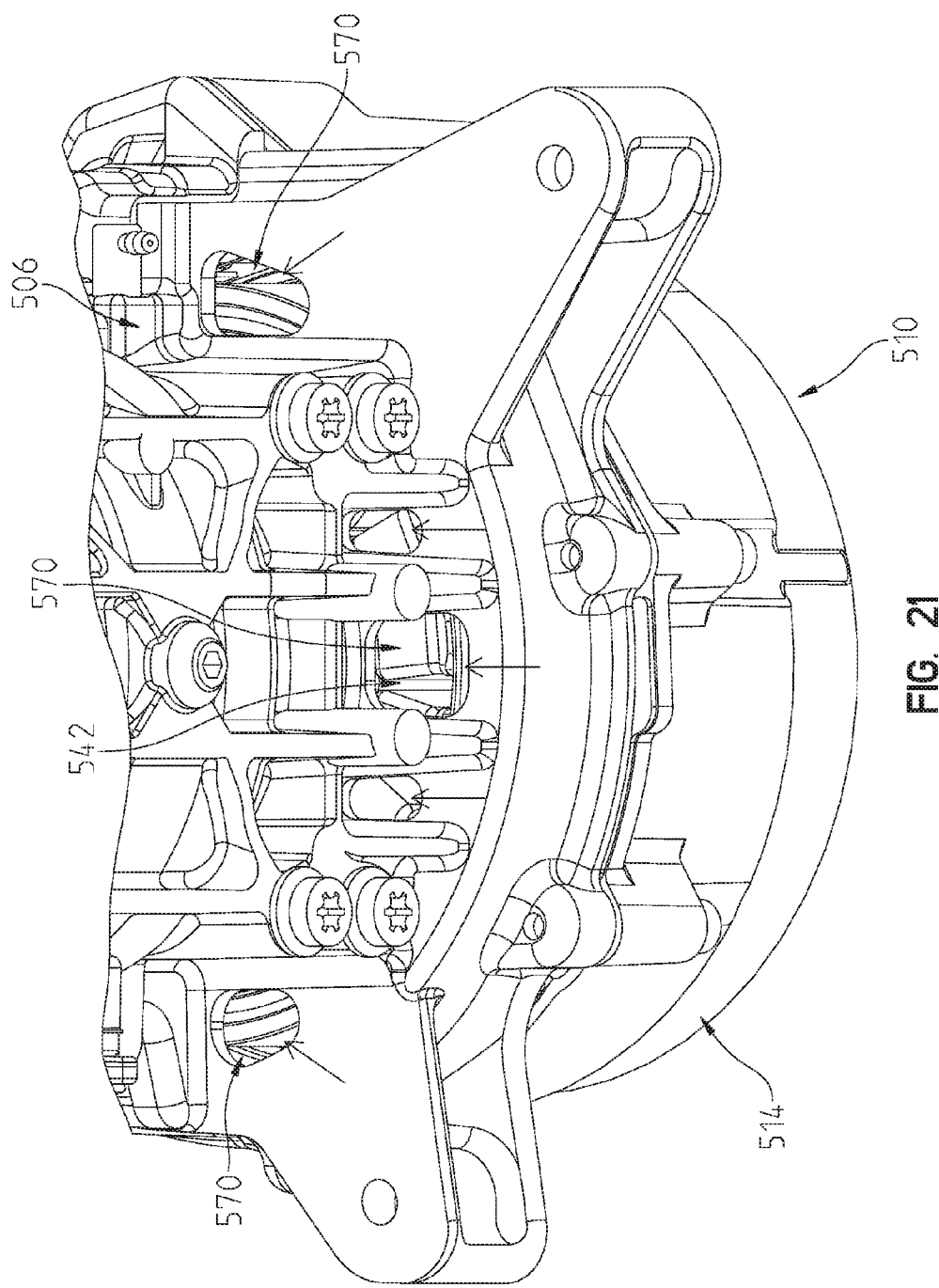
FIG. 21 is a back perspective view of the assembled crankcase and power generation assembly of FIG. 17.

Referring to FIG. 20, assembly 510 couples to crankcase 506 via a plurality of fasteners or bolts through housing 514. Magneto 524 includes a rotor 540 and a stator 542 having coil windings. Rotor 540 illustratively includes a permanent magnet 541 operative to rotate around coils of stator 542 to induce a voltage and current in the stator coils that is regulated by power boost regulator 24 (FIG. 1). Another suitable magneto, alternator, or electrical generator may be provided. A plurality of spaced openings 570 are formed in crankcase 506 behind magneto 524 (FIGS. 20 and 21).

Shroud 516 extends from the outer wall of crankcase 506 to the outer wall of magneto 524, thereby forcing air drawn through openings 570 behind magneto 524 to flow over the stator windings 542 and through openings in the flywheel 522. Shroud 516 thereby blocks or limits the intake air from openings 570 from flowing around the outside of stator 542 and flywheel 522. In operation, flywheel 522 or a separate fan or air pump draws air through openings 570 of crankcase 506 and over stator coils 542 of magneto 524. Shroud 516 blocks air flow around flywheel 522 causing the air to flow through openings in flywheel 522, openings 574 (FIG. 22) in recoil starter 520, and out openings 556 of housing 514.

In one embodiment, assembly 510 is operative to draw air from a cooler side of engine 500 behind magneto 524 and to outlet the air to a hotter side of engine 500, thereby facilitating cooling of magneto 524. For example, an exhaust system may be coupled adjacent recoil starter 520 which causes additional heat at that side of engine 500.

FIG. 30 shows an alternative embodiment flywheel 950. Flywheel 950 includes a circumferential wall 966 on which alternating magnetic poles 962, 964 are mounted. On the exterior of wall 966 is mounted a ferrous steel ring 958. The inner side of wall 966 has a non-magnetic stainless ring 952 mounted thereto. The wall 966 includes slots 956 therein. Flywheel 950 further includes ribs 968 extending from an end face and includes a plurality of holes in the end face. In operation, air (or oil) approaching flywheel 950 in direction 960 enters flywheel 950 via the holes in the end face (or otherwise) and is routed radially in the direction of arrows 954 with the aid off ribs 968. The air (or oil) enters slots 956 and exits the upper side (as oriented in FIG. 30). This configuration provides additional cooling to flywheel 950 and to the magnetic poles 962, 964. As previously noted, a controlled temperature proximate magnetic poles 962, 964 provides improved performance and consistency of performance relative to poles 962, 964 with elevated temperature.

As previously noted, PBR 300, 350, 360 includes serial communication. PBR 300, 350, 360 is able to sense internal temperatures, either directly via sensors, or indirectly via measurements indicating things such as degradation in performance. When the internal temperature reaches a set-point that is able to be calibrated, then the PBR 300, 350, 360 will send a CAN message to the ECU 400 that controls the fan 900. The ECU 400 will then turn on the fan until the PBR CAN message indicating elevated temperature is no longer active.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of electrical power generation in a vehicle, the method including:
   receiving, by a power boost regulator, alternating current (AC) power from an AC generator coupled to an output of an engine of a vehicle, the engine being operatively coupled to a ground engaging member of the vehicle to move the vehicle;

determining, by an electronic controller of the power boost regulator, a target current level and a target voltage level of power output by the AC generator based on a rotational speed of the engine;

controlling, by the power boost regulator, the AC generator to generate the AC power at the target current level and the target voltage level;

regulating, by the power boost regulator, the AC power to provide boosted direct current (DC) power for use by an electrical system of the vehicle; and selectively distributing, by a power steering stage of the power boost regulator, the DC power to electrical loads of the vehicle based on a priority distribution schedule, wherein the electrical loads of the vehicle include an engine controller, at least one pump, and at least one chassis load and the engine controller has a higher priority than the at least one pump, and the at least one pump has a higher priority than the at least one chassis load.

2. The method of claim 1, wherein the at least one pump includes a fuel pump and an oil pump, and the at least one chassis load includes at least one of a taillight, a handwarmer device, and a power relay for vehicle accessories.

3. A method of electrical power generation in a vehicle, the method including:

receiving, by a power boost regulator, alternating current (AC) power from an AC generator coupled to an output of an engine of a vehicle, the engine being operatively coupled to a ground engaging member of the vehicle to move the vehicle;

determining, by an electronic controller of the power boost regulator, a target current level and a target voltage level of power output by the AC generator based on a rotational speed of the engine;

controlling, by the power boost regulator, the AC generator to generate the AC power at the target current level and the target voltage level;

regulating, by the power boost regulator, the AC power to provide boosted direct current (DC) power for use by an electrical system of the vehicle; and selectively distributing, by a power steering stage of the power boost regulator, the DC power to electrical loads of the vehicle based on a priority distribution schedule, wherein the electrical loads of the vehicle include an engine controller, at least one pump, and at least one chassis load, further including, in response to a startup event of the engine, distributing the DC power to the engine controller prior to distributing the DC power to the at least one pump and the at least one chassis load, and further including distributing the DC power to the at least one pump in response to the DC power distributed to the engine controller exceeding a power level threshold.

4. The method of claim 3, wherein the startup event includes a manual recoil start by an operator.

5. A method of electrical power generation in a vehicle, the method including:

receiving, by a power boost regulator, alternating current (AC) power from an AC generator coupled to an output of an engine of a vehicle, the engine being operatively coupled to a ground engaging member of the vehicle to move the vehicle;

determining, by an electronic controller of the power boost regulator, a target current level and a target voltage level of power output by the AC generator based on a rotational speed of the engine;

controlling, by the power boost regulator, the AC generator to generate the AC power at the target current level and the target voltage level;

regulating, by the power boost regulator, the AC power to provide boosted direct current (DC) power for use by an electrical system of the vehicle; and selectively distributing, by a power steering stage of the power boost regulator, the DC power to electrical loads of the vehicle based on a priority distribution schedule, wherein the electrical loads of the vehicle include an engine controller, at least one pump, and at least one chassis load, further including, in response to a startup event of the engine, distributing the DC power to the engine controller prior to distributing the DC power to the at least one pump and the at least one chassis load, and further including distributing the DC power to the at least one chassis load in response to the DC power distributed to the engine controller exceeding a first power level threshold and the DC power distributed to the at least one pump exceeding a second power level threshold.

6. A method of electrical power generation in a vehicle, the method including:

receiving, by a power boost regulator, alternating current (AC) power from an AC generator coupled to an output of an engine of a vehicle;

determining, by an electronic controller of the power boost regulator, a target current level and a target voltage level of power output by the AC generator based on a rotational speed of the engine;

controlling, by the power boost regulator, the AC generator to generate the AC power at the target current level and the target voltage level;

regulating, by the power boost regulator, the AC power to provide boosted direct current (DC) power for use by an electrical system of the vehicle; and selectively distributing, by a power steering stage of the power boost regulator, the DC power to electrical loads of the vehicle based on a priority distribution schedule, wherein the electrical loads of the vehicle include an engine controller, at least one pump, and at least one chassis load, wherein the engine controller has a higher priority than the at least one pump, and the at least one pump has a higher priority than the at least one chassis load.

* * * * *